United States Patent [19]

Sekiya et al.

[11] Patent Number: 5,666,804
[45] Date of Patent: Sep. 16, 1997

[54] SECONDARY AIR SUPPLYING APPARATUS FOR INTERNAL COMBUSTION ENGINE AND AIR HEATING APPARATUS THEREOF

[75] Inventors: Mutuo Sekiya; Satoshi Asada; Takakazu Tochimoto; Hidetoshi Okada, all of Hyogo, Japan

[73] Assignee: Mitsubishi Denki Kabushiki Kaisha, Tokyo, Japan

[21] Appl. No.: 205,849

[22] Filed: Mar. 4, 1994

[30] Foreign Application Priority Data

Mar. 29, 1993 [JP] Japan ................................ 5-069964
Jun. 29, 1993 [JP] Japan ................................ 5-159701

[51] Int. Cl.$^6$ ........................................... F01N 3/30
[52] U.S. Cl. ................................ 60/284; 60/289; 60/300; 219/205; 219/548; 392/481; 392/485; 392/498
[58] Field of Search ............................ 60/289, 300, 290, 60/284, 274; 123/179.21, 556; 219/205, 548, 553; 392/481, 485, 498, 500

[56] References Cited

U.S. PATENT DOCUMENTS

| 1,456,018 | 5/1923 | Wiegand | 123/179.21 |
|---|---|---|---|
| 2,596,327 | 5/1952 | Cox | 392/485 |
| 3,503,717 | 3/1970 | Berger | 60/297 |
| 3,723,070 | 3/1973 | Houdry | 60/300 |
| 3,770,389 | 11/1973 | Kitzner | 60/300 |
| 3,787,037 | 1/1974 | Motooka | 123/556 |
| 3,982,100 | 9/1976 | Hervert | 219/205 |
| 4,098,078 | 7/1978 | Laurent | 60/301 |
| 4,120,273 | 10/1978 | Krause | 123/179.21 |
| 4,682,576 | 7/1987 | Nakamura | 123/179.21 |
| 4,950,871 | 8/1990 | Pollak | 219/370 |
| 5,459,998 | 10/1995 | Hosoya | 60/284 |
| 5,519,191 | 5/1996 | Ketcham | 392/485 |

FOREIGN PATENT DOCUMENTS

| 4307737 | 9/1963 | Germany . |
|---|---|---|
| 2337051 | 2/1974 | Germany . |
| 3757782 | 6/1978 | Germany . |
| 55-29003 | 3/1980 | Japan . |
| 56-7489 | 2/1981 | Japan . |
| 1-18802 | 6/1989 | Japan . |
| 3-2663 | 1/1991 | Japan . |

Primary Examiner—Douglas Hart

[57] ABSTRACT

A secondary air supplying apparatus for an internal combustion engine and a gas heating apparatus are provided to enable high-performance exhaust gas purification in a catalytic apparatus of the internal combustion engine, in particular, even at a low-temperature starting time. A secondary air supplying apparatus supplies secondary air to the catalytic apparatus through a secondary air introducing path for communicating the intake side of the internal combustion engine with an exhaust manifold. In the apparatus, a gas heating apparatus having an exothermic body is provided for the secondary air introducing path.

28 Claims, 30 Drawing Sheets

SECONDARY AIR SUPPLYING APPARATUS FOR INTERNAL COMBUSTION ENGINE AND AIR HEATING APPARATUS THEREOF

BACKGROUND OF THE INVENTION

1. Field of the Invention

The present invention relates to a secondary air supplying apparatus for an internal combustion engine to introduce air to an exhaust gas purifying catalyst for purpose of exhaust gas purification at a starting time of the internal combustion engine, especially for purpose of reduction of HC, CO, and $NO_x$, and relates to a gas heating apparatus thereof.

2. Description of the Prior Art

FIG. 1 is a general view of a conventional secondary air supplying apparatus. In the drawing, reference numeral 1 is an internal combustion engine body in communication with an air flow duct 2. The air flow duct 2 includes an air cleaner 3, an air flow sensor 4, a throttle body 5 for gradually releasing an air flow, a surge tank 6 for arranging the air flow, an intake manifold 7, an exhaust manifold 8 through which the air discharged from the internal combustion engine body 1 passes, a catalytic apparatus 9 having a catalyst for purifying the exhaust gas, and an exhaust muffler 10 in this order starting from the intake side toward the exhaust side.

A secondary air supply pipe 11 is provided between the air cleaner 3 and the exhaust manifold 8 in the air flow duct 2 to supply secondary air to the catalytic apparatus 9. In the illustrative embodiment, an air pump 12, a flow control valve 13, and a check valve 13a are mounted in the course of the secondary air supply pipe 11. The air pump 12 and the flow control valve 13 are connected to a control unit 14 which is connected to a detecting apparatus 15 for detecting various conditions.

A description will now be given of the operation. Air passing through the air cleaner 3 or the like, that is, through the air flow duct 2 is sucked into the internal combustion engine body 1 together with fuel. After combustion, an exhaust gas passes through the exhaust manifold 8 to be externally discharged. The exhaust gas in the exhaust manifold 8 contains a large amount of air pollutant such as HC, CO, or $NO_x$ so that the exhaust gas is discharged into the atmosphere after reduction of the air pollutant by the catalytic apparatus 9.

However, at the start time of the internal combustion engine, the exhaust manifold 8 can not supply the catalytic apparatus 9 with air having a temperature to easily react with the catalyst and containing rich oxygen, resulting in insufficient purification of the exhaust gas. Hence, it is necessary to supply an external air through the secondary air supply pipe 11.

In the illustrative embodiment, the secondary air is forcedly supplied into the exhaust manifold 8 through the air pump 12 mounted in the course of the secondary air supply pipe 11. The control unit 14 decides depending upon data detected by the detecting apparatus 15 such as a water temperature, revolution, boost, or pump pressure. Subsequently, indication from the control unit 14 controls the revolution or the like of the air pump 12 to supply an appropriate amount of air to the upstream of the catalytic apparatus 9. Further, in the illustrative embodiment, the indication from the control unit 14 can adjust divergence of the flow control valve 13 so as to optimize a feed rate of the secondary air.

However, in the secondary air supplying apparatus, low-temperature external air is fed into the catalytic apparatus 9 at a low-temperature starting time so that the catalyst can not smoothly react due to the low temperature. Consequently, there is a problem in that the reaction in the catalytic apparatus 9 can not be promoted effectively.

In order to overcome the problem, there has been proposed a preheating apparatus disclosed in, for example, Japanese Patent Publication (kokai) No. 55-29003. As shown in FIG. 1, the preheating apparatus 16 is attached to the exhaust manifold 8 and is connected to the secondary air supply pipe 11.

The preheating apparatus transfers preheat from the exhaust gas in the exhaust manifold 8 to heat the secondary air in the secondary air supply pipe 11, thereby reducing a decrease in a temperature of a mixed gas of the exhaust gas supplied to the upstream of the catalytic apparatus 9 and the secondary air so as to promote a reaction speed in the catalytic apparatus 9.

In an alternative embodiment, the secondary air is introduced by making use of negative pressure of the exhaust manifold 8 without the air pump 12 in the course of the secondary air supply pipe 11 and the control unit 14 for controlling the air pump 12. FIG. 2 is a general view of a secondary air supplying apparatus of this kind disclosed in, for example, Japanese Utility Model Publication (Kokoku) No. 3-2663. In FIG. 2, reference numeral 11a means a secondary air supply pipe, and 11b is a lead valve mounted on the upstream of the secondary air supply pipe 11a.

The secondary air supplying apparatus utilizes a variation in exhaust pressure caused by intake and exhaust process in the internal combustion engine body 1. That is, the secondary air is introduced by opening the lead valve 11b provided for the secondary air supply pipe 11a in case of the negative pressure in the exhaust manifold 8, and the lead valve 11b is closed to prevent a counter-flow of the exhaust gas in case of positive pressure in the exhaust manifold 8.

The conventional secondary air supplying apparatus for the internal combustion engine is provided as set forth above. Therefore, in either case, it is impossible to stably supply the secondary air having a preferable temperature to the catalytic apparatus 9. Accordingly, the catalytic apparatus 9 can not provide a sufficient effect of the exhaust gas purification, and can not significantly contribute to prevention of air pollution which has been increasingly strongly desired in view of environmental protection in recent years.

That is, the one apparatus described referring to FIG. 1 (which is disclosed in Japanese Patent Publication (Kokai) No. 29003 or the like) makes use of the preheat from the exhaust manifold 8, and can not increase the secondary air temperature sufficiently at the low-temperature starting time at which the exhaust manifold 8 is not hot yet, resulting in insufficient promotion of the reaction in the catalytic apparatus 9.

Further, in the other apparatus discussed referring to FIG. 2 (which is disclosed in Japanese Utility Model Publication No. 3-2663 or the like), the secondary air can automatically be introduced only in case of the negative pressure in the exhaust manifold 8. Hence, it is impossible to stably supply sufficient air required for reduction of the air pollutant such as HC, CO, or $NO_x$, resulting in a little effect in the exhaust gas purification. In addition, it is necessary to supply the secondary air at the low-temperature starting time at which the catalytic apparatus can not exhibit its true performance. However, a problem remains that catalyst purification efficiency is deteriorated because the exhaust gas temperature decreases when low-temperature air is excessively supplied.

SUMMARY OF THE INVENTION

The present invention is made to overcome the above problems. It is an object of the present invention to provide a secondary air supplying apparatus which enables high-performance exhaust gas purification, in particular, even at a low-temperature starting time, and provide a gas heating apparatus thereof.

According to the first aspect of the present invention, for achieving the above-mentioned objects, there is provided a secondary air supplying apparatus for an internal combustion engine in which a gas heating apparatus having an exothermic body is provided for a secondary air introducing path for communicating the intake side of the internal combustion engine with a catalyst.

As stated above, in the secondary air supplying apparatus for the internal combustion engine according to the first aspect of the present invention, secondary air is heated by the exothermic body of the gas heating apparatus provided for the secondary air introducing path, and the heated secondary air is mixed with an exhaust gas to flow toward the catalyst.

According to the second aspect of the present invention, there is provided a secondary air supplying apparatus for an internal combustion engine in which the exothermic body includes an electric resistor energized by a power source to generate heat.

As stated above, in the secondary air supplying apparatus for the internal combustion engine according to the second aspect of the present invention, the exothermic body includes the electric resistor, and is energized by the power source to generate heat.

According to the third aspect of the present invention, there is provided a secondary air supplying apparatus for an internal combustion engine in which a temperature sensor is provided for the exothermic body, and power supply to the exothermic body is controlled through a control unit according to a temperature of the exothermic body detected by the temperature sensor.

As stated above, in the secondary air supplying apparatus for the internal combustion engine according to the third aspect of the present invention, the power supply is controlled through the control unit according to the temperature of the exothermic body detected by the temperature sensor.

According to the fourth aspect of the present invention, there is provided a gas heating apparatus including a hollow and cylindrical case, positive and negative electrodes attached to the case, and an exothermic body coupled between the electrodes, wherein the exothermic body is formed by spirally winding an electric resistor, and is disposed in the case so as to form an air path extending in the same direction as an axial direction of the case.

As stated above, in the gas heating apparatus according to the fourth aspect of the present invention, the exothermic body is formed by spirally winding the electric resistor, and is disposed in the case so as to form the air path extending in the same direction as the axial direction of the case. Consequently, air can be heated when the air passes through the air path of the exothermic body.

According to the fifth aspect of the present invention, there is provided a gas heating apparatus including the exothermic body which is provided in a sheet-like form.

As stated above, in the gas heating apparatus according to the fifth aspect of the present invention, since the exothermic body is provided in the sheet-like form, it is possible to provide a larger area where a gas passing through the gas heating apparatus can contact the exothermic body.

According to the sixth aspect of the present invention, there is provided a gas heating apparatus in which the plurality of exothermic bodies are disposed at intervals in an axial direction of the case, and are mutually coupled through a coupling member.

As stated above, in the gas heating apparatus according to the sixth aspect of the present invention, the plurality of exothermic bodies are disposed, thereby providing a sheet-like electric resistor having a relatively thick form.

According to the seventh aspect of the present invention, there is provided a gas heating apparatus in which the opposite exothermic bodies are mutually disposed such that their air paths are disposed out of alignment with each other.

As stated above, in the gas heating apparatus according to the seventh aspect of the present invention, the opposite exothermic bodies are mutually offset such that their air paths are disposed out of alignment with each other. Consequently, air passes through a center portion of the air path of one exothermic body to flow around an electric resistor of the next exothermic body. As a result, it is possible to uniformly heat the air passing through the gas heating apparatus.

According to the eighth aspect of the present invention, there is provided a gas heating apparatus in which the coupling member includes a rod for coupling mutual center portions of exothermic bodies, both ends of the rod being supported by a holder, the holder being secured to a case, and a window hole being provided in the holder to pass air.

As stated above, in the gas heating apparatus according to the eighth aspect of the present invention, the plurality of exothermic bodies are supported by the rod for coupling mutual center portions thereof, and the rod is supported by the holder at the both ends of the case. Therefore, it is possible to facilitate assembly of the exothermic body, and stabilize an assembled state.

According to the ninth aspect of the present invention, there is provided a gas heating apparatus in which a convex cone member is disposed at a center portion of an air inflow side aperture in the case to face the inflow side aperture.

As stated above, in the gas heating apparatus according to the ninth aspect of the present invention, the air flowing from an intermediate portion in the gas heating apparatus has a higher flow velocity than that of air flowing from a peripheral portion. Thus, though the air tends to be concentrated on the intermediate portion of the gas heating apparatus, the cone member distributes the air to the peripheral portion. It is thereby possible to provide uniform inflow of the air in the entire gas heating apparatus.

According to the tenth aspect of the present invention, there is provided a gas heating apparatus including a hollow and cylindrical case, positive and negative electrodes attached to the case, and an exothermic body coupled between the electrodes, wherein the exothermic body is provided in a corrugated and annularly curved form such that a sheet-like electric resistor has a petal-like section, and is axially disposed in the case so as to form an air path in the case.

As stated above, in the gas heating apparatus according to the tenth aspect of the present invention, a power source is connected to the positive and negative electrodes of the petal-like exothermic body provided for a secondary air introducing path. It is thereby possible to supply air passing through the secondary air introducing path to a catalyst after efficient heating.

According to the eleventh aspect of the present invention, there is provided a gas heating apparatus in which both ends of the exothermic body are supported by a heat resisting insulator having many through-holes to be fixed to the case.

As stated above, in the gas heating apparatus according to the eleventh aspect of the present invention, the both ends of the sheet-like exothermic body are supported by the heat resisting insulator having many through-holes. It is thereby possible to prevent the metallic exothermic body from contacting the case due vibration, impact or the like so as to avoid, for example, short-circuit at a conducting time, or damage to the exothermic body due to vibration.

According to the twelfth aspect of the present invention, there is provided a gas heating apparatus in which the plurality of exothermic bodies are axially disposed in the case in series, and the respective exothermic bodies have each different resistance.

As stated above, in the gas heating apparatus according to the twelfth aspect of the present invention, the exothermic bodies are divided into a plurality of layers to provide different resistance for each layer. It is thereby possible to improve efficiency of heat transfer to air, and reduce a time required for rising a secondary air temperature.

According to the thirteenth aspect of the present invention, there is provided a gas heating apparatus in which the exothermic body is provided with a plurality of pores through which a gas freely enters and exits.

As stated above, in the gas heating apparatus according to the thirteenth aspect of the present invention, the plurality of through-holes are provided in the exothermic body so that the gas more frequently enters and exits on the back and front sides of the exothermic body. As a result, efficiency of heat transfer can be improved.

According to the fourteenth aspect of the present invention, there is provided a gas heating apparatus in which an elastic body is interposed between a heat resisting insulator positioned on the most upstream side in the heat resisting insulators and the case.

As stated above, in the gas heating apparatus according to the fourteenth aspect of the present invention, the elastic body is mounted at an end of the heat resisting insulator for supporting the exothermic body, thereby absorbing extension due to thermal expansion of the exothermic body. Further, since pressure is continuously applied in an exothermic body lamination direction, it is possible to avoid noise generation, damage or the like due to vibration of the exothermic body.

According to the fifteenth aspect of the present invention, there is provided a gas heating apparatus in which a heat resisting insulator having elasticity is interposed between outer peripheries of the exothermic body and a heat resisting insulator, and an inner periphery of the case.

As stated above, in the gas heating apparatus according to the fifteenth aspect of the present invention, the heat resisting insulator having the elasticity is interposed between the exothermic body and the heat resisting insulator, and the case containing the exothermic body and the heat resisting insulator. Therefore, it is possible to minimize heat transfer to the case, and avoid, for example, damage to an exothermic part due to vibration, impact or the like.

According to the sixteenth aspect of the present invention, there is provided a secondary air supplying apparatus for an internal combustion engine including a supplying apparatus which enables periodic variation in secondary air supplied to the exhaust side of the internal combustion engine.

As stated above, in the secondary air supplying apparatus for the internal combustion engine according to the sixteenth aspect of the present invention, an oxygen rich state and an oxygen short state in an exhaust pipe are repeated by varying a feed rate of air supplied to a catalytic apparatus with predetermined amplitude and for a constant period. It is thereby possible to improve reaction efficiency in the catalytic apparatus.

According to the seventeenth aspect of the present invention, there is provided a secondary air supplying apparatus for an internal combustion engine in which the supplying apparatus includes a pump which is mounted for a secondary air introducing path for communicating the intake side of the internal combustion engine with a catalyst, and enables periodic variation in revolution with constant amplitude.

As stated above, in the secondary air supplying apparatus for the internal combustion engine according to the seventeenth aspect of the present invention, an oxygen rich state and an oxygen short state in an exhaust pipe are repeated by varying a feed rate of air supplied to a catalytic apparatus with predetermined amplitude and for a constant period. It is thereby possible to improve reaction efficiency in the catalytic apparatus.

According to the eighteenth aspect of the present invention, there is provided a secondary air supplying apparatus for an internal combustion engine in which the supplying apparatus includes a pump mounted for a secondary air introducing path for communicating the intake side of the internal combustion engine with a catalyst, and a flow control unit provided for the secondary air introducing path to be periodically switchable with constant amplitude.

As stated above, in the secondary air supplying apparatus for the internal combustion engine according to the eighteenth aspect of the present invention, an oxygen rich state and an oxygen short state in an exhaust pipe are repeated by varying a feed rate of air supplied to a catalytic apparatus with predetermined amplitude and for a constant period. It is thereby possible to improve reaction efficiency in the catalytic apparatus.

According to the nineteenth aspect of the present invention, there is provided a secondary air supplying apparatus for an internal combustion engine in which a relief mechanism is mounted between the pump and the flow control unit in the secondary air introducing path.

As stated above, in the secondary air supplying apparatus for the internal combustion engine according to the nineteenth aspect of the present invention, the relief mechanism relieves air discharged from the pump to the intake side of the engine so as to prevent pressure on the pump discharging side from excessively rising in case the flow control unit is in a closing state. According to the twentieth aspect of the present invention, there is provided a secondary air supplying apparatus for an internal combustion engine in which the flow control unit is integrally formed with a relief mechanism.

As stated above, in the secondary air supplying apparatus for the internal combustion engine according to the twentieth aspect of the present invention, the flow control unit is integrally formed with the relief mechanism. It is thereby possible to realize their functions by a smaller and inexpensive structure.

According to the twenty-first aspect of the present invention, there is provided a secondary air supplying apparatus for an internal combustion engine in which a pump and a gas heating apparatus are provided for a secondary air introducing path for communicating the intake side of the internal combustion engine with a catalyst.

As stated above, in the secondary air supplying apparatus for the internal combustion engine according to the twenty-first aspect of the present invention, the gas heating apparatus and the pump are provided for the secondary air introducing path, thereby enabling forced supply of hot secondary air. It is thereby possible to significantly promote activation of a catalyst.

According to the twenty-second aspect of the present invention, there is provided a secondary air supplying apparatus for an internal combustion engine in which a gas heating apparatus and a supplying apparatus which enables periodic variation in secondary air supplied to the catalyst are provided for a secondary air introducing path for communicating the intake side of the internal combustion engine with a catalyst.

As stated above, in the secondary air supplying apparatus for the internal combustion engine according to the twenty-second aspect of the present invention, while a feed rate of the air supplied to the catalyst is varied with predetermined amplitude and for a constant period, the gas heating apparatus increases a temperature of the secondary air to an appropriate temperature so as to supply the secondary air. Therefore, it is possible to significantly improve catalyst purification efficiency without reduction of an exhaust gas temperature.

According to the twenty-third aspect of the present invention, there is provided a secondary air supplying apparatus for an internal combustion engine including a computer unit for deciding depending upon a detected value indicating an operating state of the internal combustion engine such as an intake air temperature, a water temperature, revolution, or boost so as to control the supplying apparatus, the pump, the flow control unit or the gas heating apparatus.

As stated above, in the secondary air supplying apparatus for the internal combustion engine according to the twenty-third aspect of the present invention, the computer unit automatically controls the operation of the secondary air supplying apparatus according to the sixteenth aspect to the twenty-second aspect depending upon the operating state of the internal combustion engine.

The above and further objects and novel features of the invention will more fully appear from the following detailed description when the same is read in connection with the accompanying drawing. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 1:
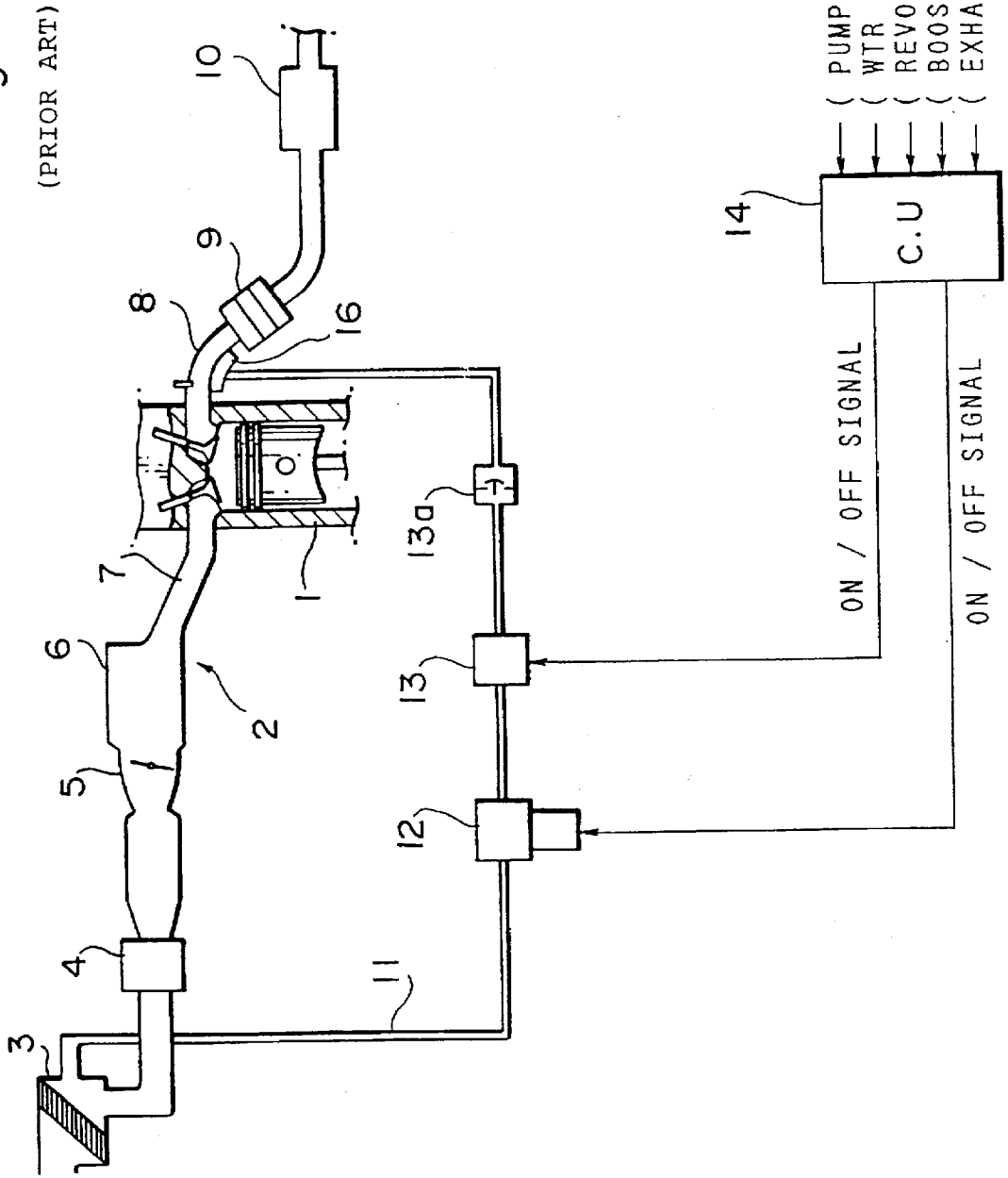
FIG. 1 is a diagram showing one embodiment of a conventional secondary air supplying apparatus.
Figure 2:
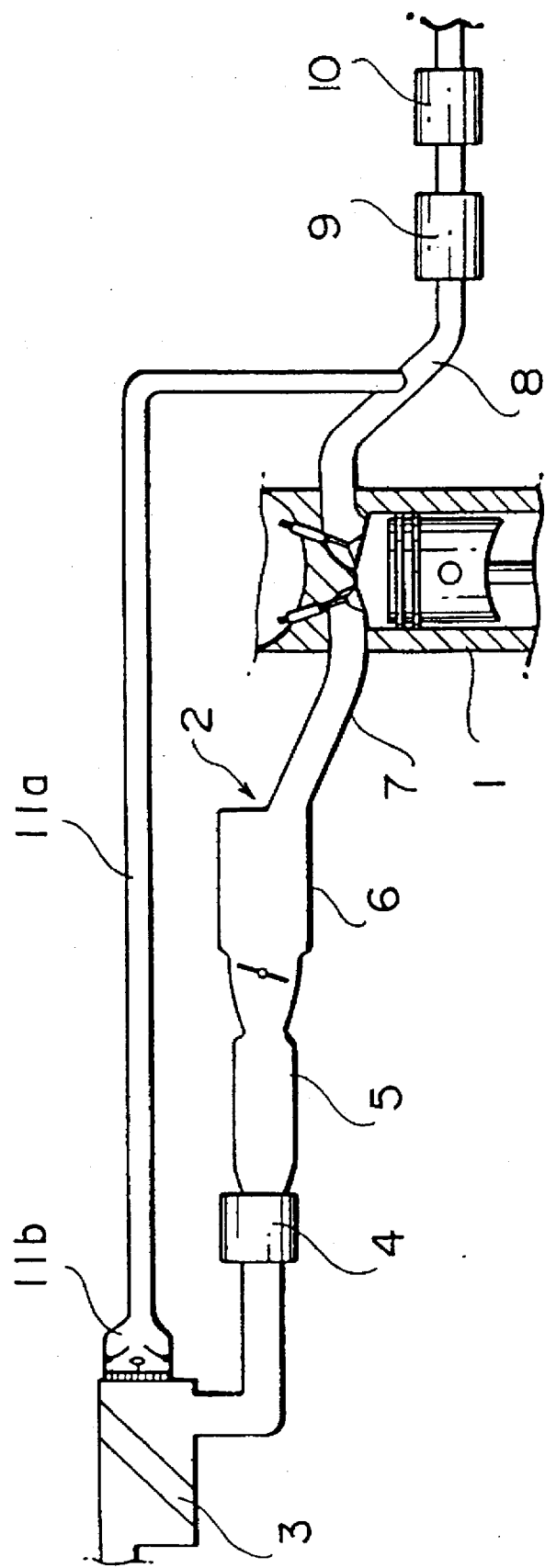
FIG. 2 is a diagram showing another embodiment of the conventional secondary air supplying apparatus.
Figure 3:
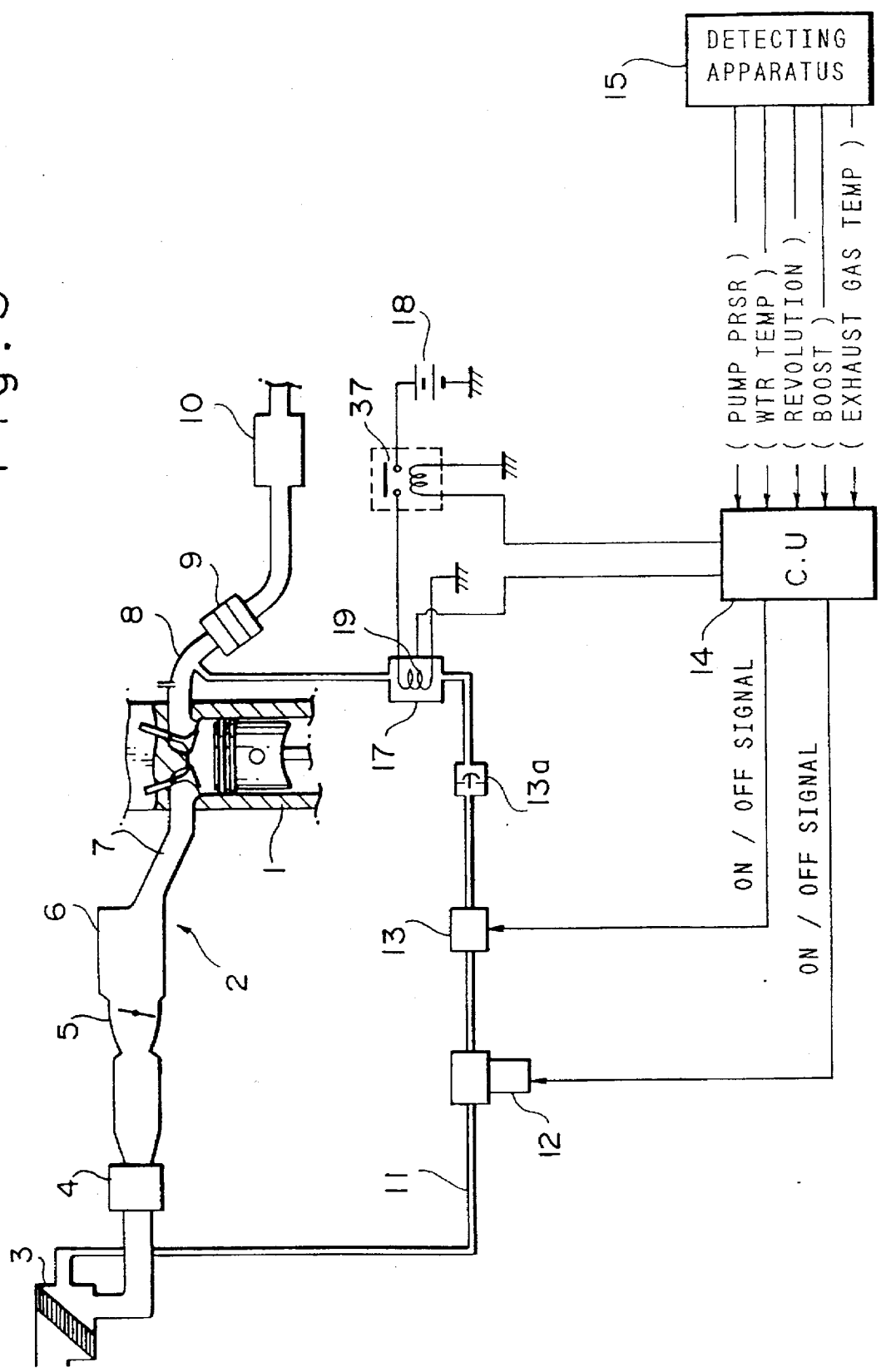
FIG. 3 is a diagram showing an embodiment of a secondary air supplying apparatus according to the first to third aspects, and an intake/exhaust system of an internal combustion engine to which the secondary air supplying apparatus is applied.

A description will now be given of one embodiment according to the first to fifth aspects of the present invention. In FIG. 3, reference numeral 17 is a gas heating apparatus which is provided for a secondary air supply pipe 11 (a secondary air introducing path) serving as a secondary air supply path. Component parts other than the gas heating apparatus 17 and structures other than a structure in relation thereto are identical with those in a conventional embodiment in FIG. 1. Hence, the same reference numerals are used for the component parts, and descriptions thereof are omitted.

In the secondary air supplying apparatus according to the embodiment, a vehicle battery 18 serving as a power source feeds power to the gas heating apparatus 17 for heat generation, and one end of the gas heating apparatus 17 is connected to a control unit 14. As described in Prior Art, the control unit 14 controls an air pump 12 or a flow control valve 13 according to pump pressure, a water temperature, revolution, boost, an intake air temperature or the like. In the embodiment, the control unit 14 further controls the power supply to the gas heating apparatus 17 according to, for example, an exothermic time of the gas heating apparatus 17, or a temperature of an exothermic body of the gas heating apparatus 17 detected by a temperature sensor 19 (which is provided for the gas heating apparatus 17 as will be described in the embodiment 6 but omitted in FIG. 5).

In the embodiment, the gas heating apparatus 17 causes heat generation by the electric power fed from the power source. However, it is to be noted that the present invention should not be limited to this, for example, the heat generation may be caused by a characteristic inherent in the gas heating apparatus.

Figure 4:
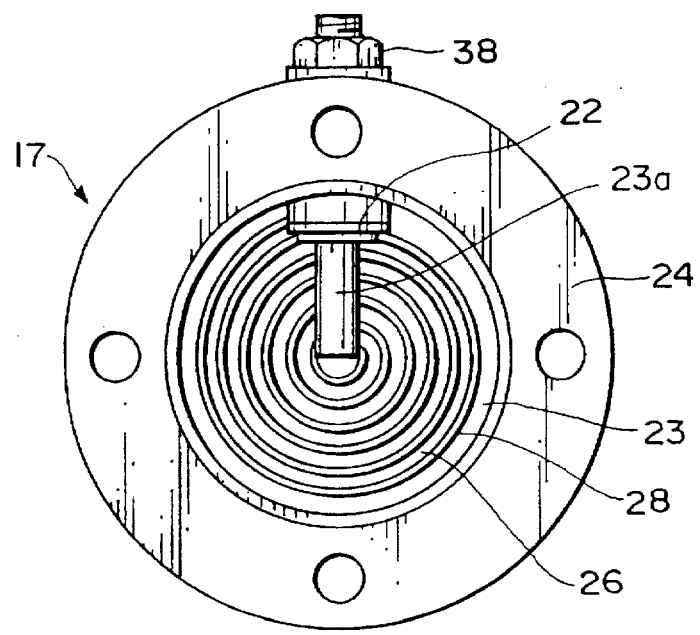
FIG. 4 is a front view of an embodiment of a gas heating apparatus according to the fourth and fifth aspects.
Figure 5:
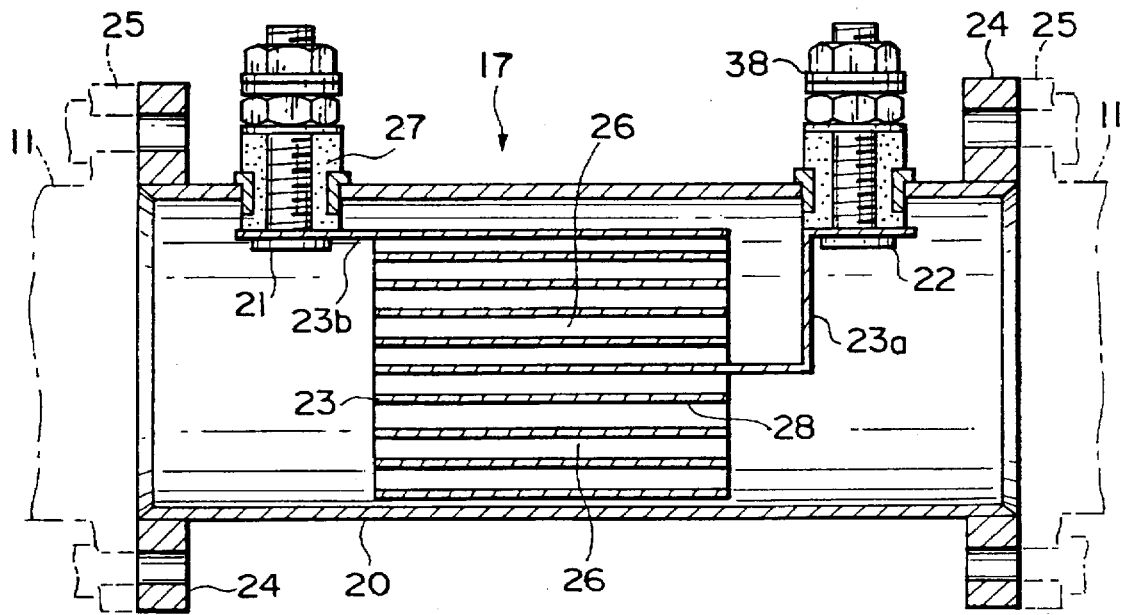
FIG. 5 is a side sectional view of the embodiment of the gas heating apparatus according to the fourth and fifth aspects.

As shown in FIGS. 4 and 5, the gas heating apparatus 17 includes a case 20, and electrodes 21 and 22. The case 20 is provided in a hollow and cylindrical form, and flange portions 24 are formed at both ends of the case 20. The flange portions 24 are coupled by fasteners with flange portions 25 which are provided in the course of the secondary air supply pipe 11. The electrodes 21 and 22 are secured to holes provided in the case 20 through spacers 27 by fasteners 38. In this case, reference numeral 21 is a positive electrode, and 22 is a negative electrode.

The case 20 includes an exothermic body 23. The exothermic body 23 is formed by spirally winding a sheet, and the sheet includes an electric resistor 28 (for example, stainless) serving as a conductor having a predetermined value of resistance in such a condition that a predetermined surface area is ensured. A portion between wound sheets is defined as an air path 26. In the embodiment, one connecting strip 23a extends from a center portion of the spiral to be connected to the negative electrode 22, and the other connecting strip 23b extends from a peripheral edge of the spiral to be connected to the positive electrode 21. Thus, the exothermic body 23 is supported through the connecting strips 23a and 23b in the case 20, and is connected to a battery 18 in series. As set forth above, the exothermic body 23 is formed by spirally winding the sheet-like electric resistor 28, and the portion between the wound sheets is defined as the air path 26. It is thereby possible to ensure an exothermic area serving to such an extent that flowing air can sufficiently be heated.

A description will now be given of the operation.

In the internal combustion engine system shown in FIG. 3, when external air flows into an air flow pipe 2 through an air cleaner 3, the air partially flows into the secondary air supply pipe 11 through the air pump 12 and the flow control valve 13. In particular, at a starting time of an internal combustion engine body 1, the air pump 12 is driven at a high speed so as to feed a large amount of air to a catalytic apparatus 9.

On the other hand, electric power is appropriately fed to the exothermic body 23 of the gas heating apparatus 17 for the heat generation by, for example, opening of a relay contact 37 (shown in FIG. 3) working with opening of a key switch of a vehicle. Further, when the secondary air passes between the electric resistors of the exothermic body the air contacts the electric resistors to be heated. In this case, the exothermic body 23 has a longitudinal length axially extending so that the secondary air can sufficiently be heated at the time of passing through the exothermic body 23.

The secondary air passing through the gas heating apparatus 17 exits the secondary air supply pipe 11 to flow into an exhaust manifold 8, and is mixed with an exhaust gas from the internal combustion engine body 1. Subsequently, the mixed air flows into the catalytic apparatus 9 and is discharged to the external air after toxic substances such as HC, CO, or $NO_x$ are removed from the mixed air by a catalyst.

Figure 13:
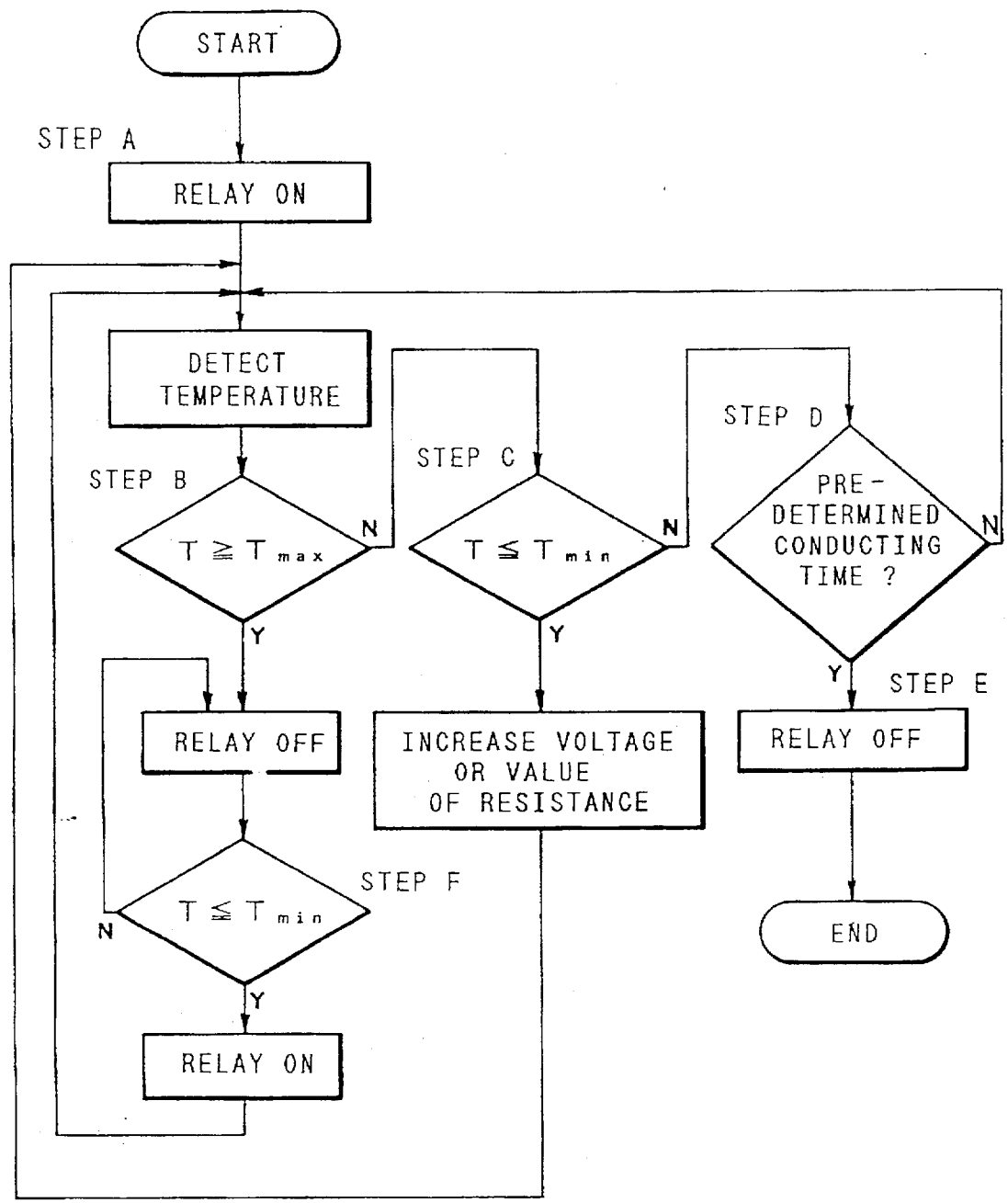
FIG. 13 is a flowchart illustrating the operation of the embodiment of the secondary air supplying apparatus according to the third aspect.

At this time, the control unit 14 controls the gas heating apparatus 17 or the like as will be described depending upon value detected by the temperature sensor 19 or the like. Referring now to FIG. 13, a description will be given of the operation in this case.

First, the control unit 14 detects an operating state of the engine 1 working with opening the key switch of the vehicle. When it is determined that heating of the secondary air is required the relay contact 37 is opened to start the power supply to the exothermic body While a temperature of the exothermic body 23 increases with the elapse of time, the temperature is detected by the temperature sensor 19 (Step A).

On the other hand, it is decided whether or not the temperature reaches the maximum temperature Tmax based upon the predetermined maximum temperature Tmax and the predetermined minimum temperature Tmin of the exothermic body 23 (Step B). Values of the maximum temperature Tmax and the minimum temperature Tmin may be determined in view of a temperature at which the exhaust gas can be reacted with the catalyst so as to easily and effectively remove the toxic substances. Excessively hot secondary air causes damage to the gas heating apparatus 17, and too cold secondary air tends to prevent easy reaction of HC and CO with the catalyst. Therefore, the secondary air having a temperature in a range to effectively remove all of $NO_x$, HC, and CO may be supplied.

At the Step B, the relay contact 37 is opened if it is detected that the temperature has reached the maximum temperature Tmax, or it is determined whether or not the temperature has reached the minimum temperature Tmin if it is detected that the temperature has not reached the maximum temperature Tmax (Step C). In case it is determined that the temperature has reached the minimum temperature Tmin, voltage applied to the exothermic body 23 from the battery 18 is increased so as to increase the temperature of the exothermic body 23. Alternatively, for example, a contact point between the battery 18 and the exothermic body 23 is moved in a direction to increase a value of resistance so as to define the electric resistors forming the exothermic body 23 as variable resistance, resulting in increased temperature of the exothermic body 23.

The secondary air is continuously heated at an appropriate temperature by continuously detecting the temperature of the exothermic body 23. Next, it is determined whether or not a time has reached a predetermined conducting time (Step D).

The predetermined time may be decided by a timer mounted in the control unit 14. Heat generation is no longer required after the elapse of time such as a low-temperature starting time of the engine 1, at which the secondary air having a specially high temperature is necessary. Accordingly, such a time is set as a power supply necessary time, thereby controlling the exothermic body 23. When the time does not reach the set time yet in Step D, the temperature detection is continued. Otherwise, the relay contact 37 is opened to complete the heat generation (Step E). After the completion, no electric power is applied to the exothermic body 23 before the next opening time of the key switch after the engine 1 is stopped. If the temperature of the exothermic body 23 reaches the maximum temperature Tmax in the Step B, the temperature detection is continued even after the relay contact 37 is opened. Thereafter, when the temperature of the exothermic body 23 is reduced to the minimum temperature Tmin, the relay contact 37 is opened again to energize the exothermic body 23 (Step F).

As set forth above, with the secondary air supplying apparatus or the gas heating apparatus, the secondary air can be heated as required by the exothermic body 23 provided for the secondary air supply pipe 11 to have the appropriate temperature. Thus, even at the low-temperature starting time of the engine 1, it is possible to remove the toxic substances such as HC, CO, or $NO_x$ at higher removal efficiency, and to contribute to significant prevention of air pollution.

In the embodiment, instead of the air pump 12 and the flow control valve 13 which are disposed at the secondary air supply pipe 11, the secondary air may be introduced into the exhaust manifold 8 by positive and negative pressure of the internal combustion engine body 1. Alternatively, the secondary air supply pipe 11 may be branched in the course thereof, and one of the branched pipes may be connected to the exhaust manifold 8 and the other may directly be connected to the catalytic apparatus 9.

Embodiment 2

Figure 6:
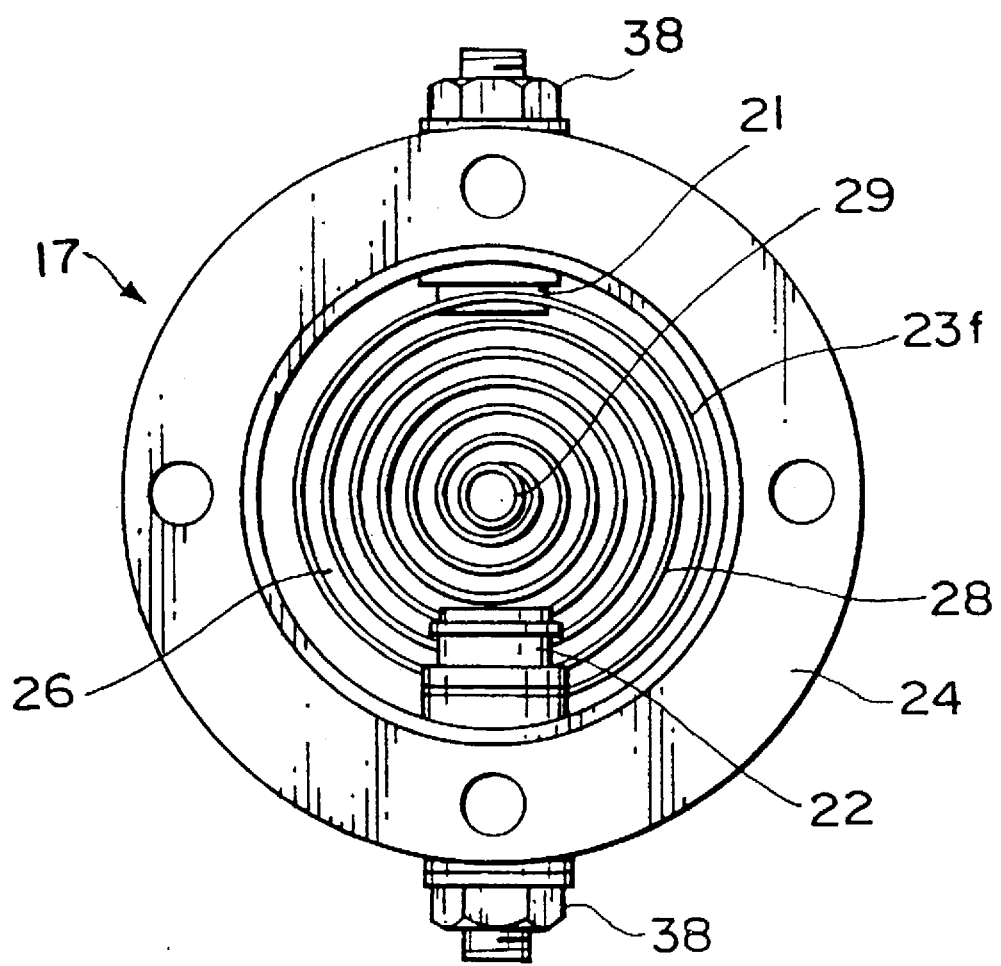
FIG. 6 is a front view of an embodiment of a gas heating apparatus according to the sixth aspect.
Figure 7:
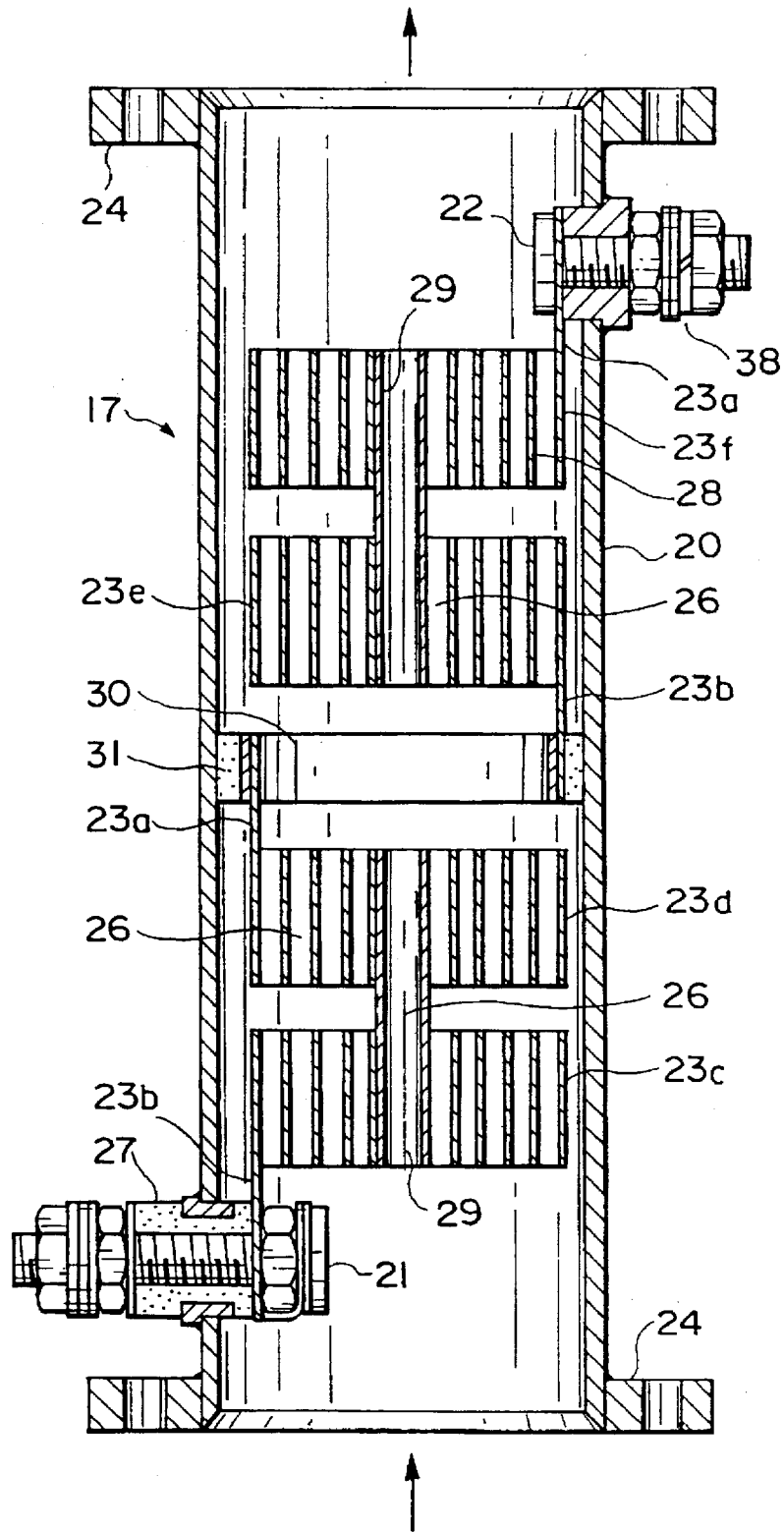
FIG. 7 is a side sectional view of the embodiment of the gas heating apparatus according to the sixth aspect.

Referring now to FIGS. 6 and 7, a description will be given of one embodiment of a gas heating apparatus according to the sixth aspect. As shown in FIGS. 6 and 7, in the gas heating apparatus 17 in the embodiment, a case 20 contains a plurality of exothermic bodies (four of which are shown). Though the exothermic bodies 23c, 23d, 23e, and 23f have the same form as described in the embodiment 1, an electric resistor 28 forming each exothermic body may be provided in a thicker form than that shown in FIGS. 4 and 5.

Since there is only one exothermic body 23 in the embodiment 1, the electric resistor 28 must be provided in a considerably thin form so as to ensure a predetermined heat value. In contrast with this, since four exothermic bodies are used in the embodiment 2, it is possible to provide predetermined electric resistance (of about 100 mΩ) as a whole even if the electric resistors have a relatively thick form. Hence, there are effects in that the apparatus can be designed in an increased degree of freedom, and fabrication of the exothermic body is facilitated.

In the exothermic bodies, a peripheral edge of the exothermic body 23c is connected to a positive electrode 21 through a connecting strip 23b, and a cylindrical coupling member 29 (a metallic pipe) is welded to a center portion of the exothermic body 23c. A hollow portion of the coupling member 29 also forms an air path 26. The other end of the coupling member 29 is welded to a spiral center portion of the adjacent exothermic body 23d. A spiral peripheral edge of the exothermic body 23d is connected through a connecting strip 23a to an inner surface of a connecting ring 30. The connecting ring 30 is attached to an inner surface of the case 20 through an insulating member 31.

Further, the exothermic body 23e is provided adjacent to the connecting ring 30, and one end of the exothermic body 23e is attached to an outer periphery of the connecting ring 30 through the connecting strip 23b. The exothermic body 23f is mounted adjacent to the exothermic body 23e, and intermediate portions of the exothermic bodies 23f and 23e are mutually coupled by the coupling member 29 as in the case of the exothermic bodies 23c and 23d. The other end of the exothermic body 23f is connected to a negative electrode 22 through a connecting strip 23a. The coupling member 29 and the connecting ring 30 are conductors, and the respective exothermic bodies are connected to a battery 18 in series.

Embodiment 3

Figure 8:
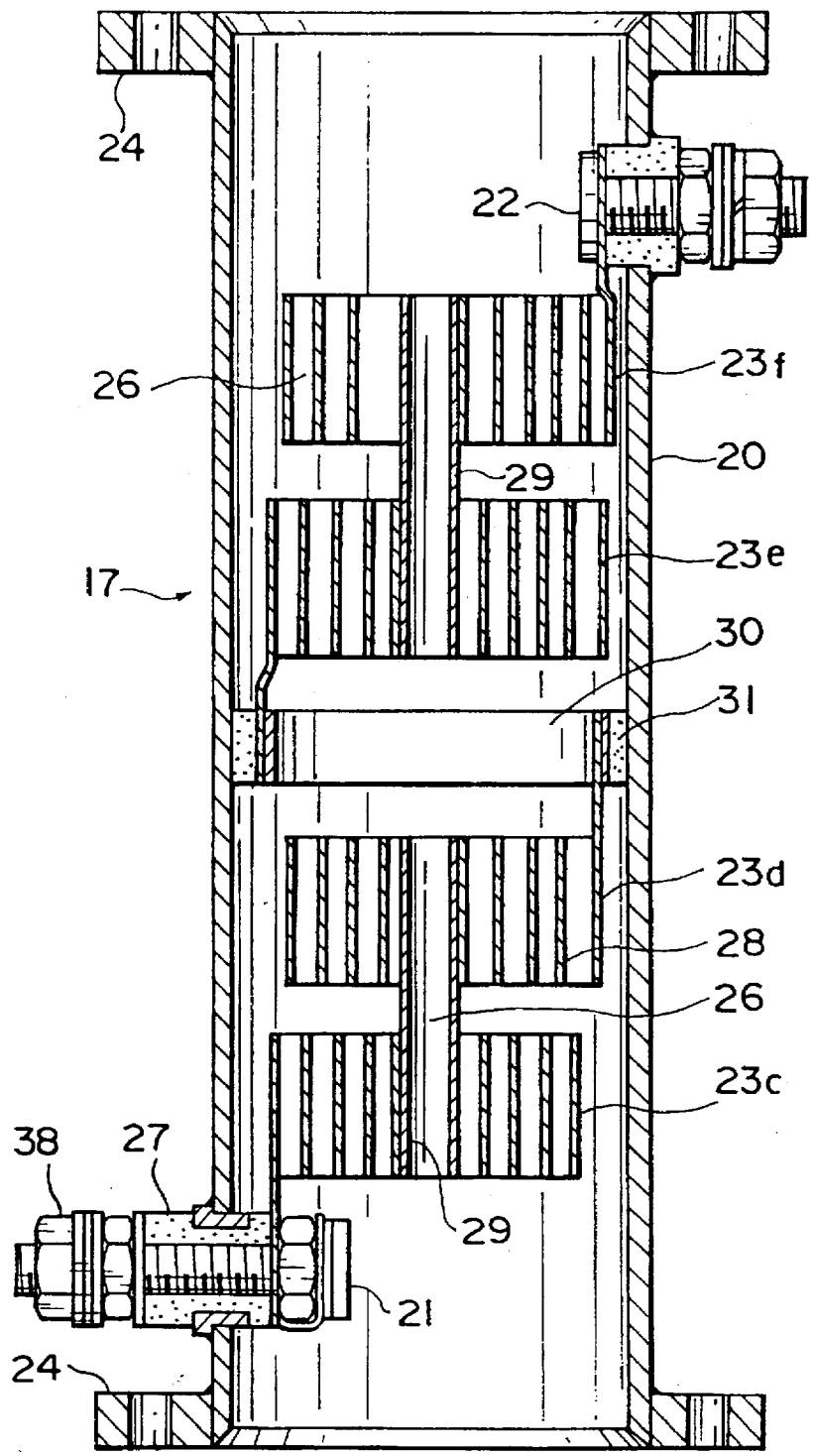
FIG. 8 is a side sectional view of an embodiment of the gas heating apparatus according to the seventh aspect.

Referring now to FIG. 8, a description will be given of one embodiment of a gas heating apparatus according to the seventh aspect. In the embodiment 3, four exothermic bodies are coupled by a coupling member 29 and a connecting ring 30 in an axial direction of a case 20 as in the embodiment 2. However, electric resistors 28 and air paths 26 of opposite exothermic bodies, that is, each couple of exothermic bodies 23c and 23d, exothermic bodies 23d and 23e, and exothermic bodies 23e and 23f are disposed so as to be out of alignment with each other in a radial direction. In the arrangement of the embodiment, in case the electric resistor 28 of one exothermic body extends in the axial direction of the case 20, the air path of the adjacent exothermic body is positioned on the extension. Further, in the embodiment, the arrangement is realized by offsetting a rotation position about a spiral center portion of the opposite exothermic body welded to the coupling member 29 by 180°.

The respective exothermic bodies are positioned as set forth above so that, for example, air passing through the exothermic body partially passes by a peripheral edge of the electric resistor 28 to pass through an intermediate portion of the air path of the next exothermic body. Inversely, air passing through the intermediate portion of the air path of the exothermic body passes by the peripheral edge of the electric resistor of the exothermic body. Therefore, it is possible to equally heat the air passing through the gas heating apparatus 17. This is because the air tends to linearly pass through the gas heating apparatus 17. On the other hand, in the air passing through the exothermic body, the air passing by the vicinity of the electric resistor can more easily be heated than that passing through the intermediate portion of the air path. Consequently, it is possible to uniformly heat the air as a whole by offsetting the adjacent exothermic bodies mutually.

Embodiment 4

Figure 9:
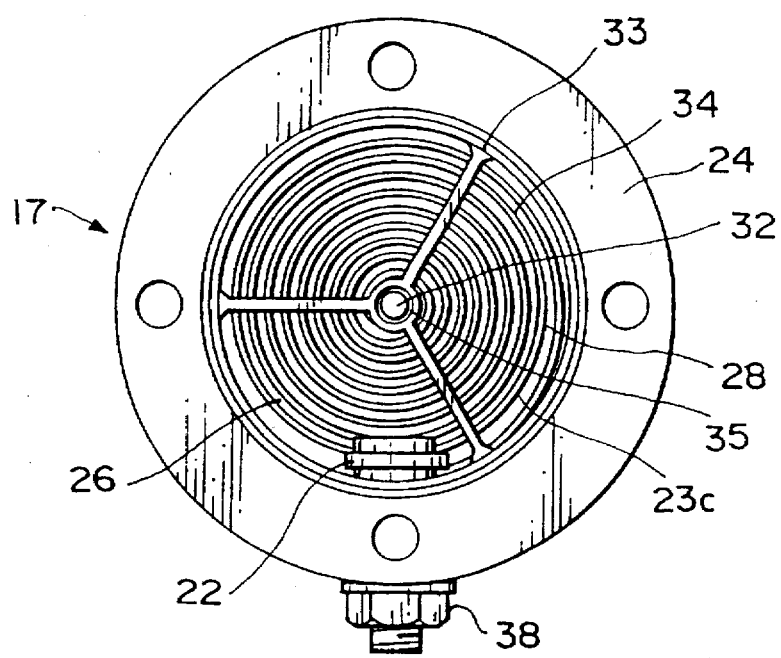
FIG. 9 is a front view of an embodiment of a gas heating apparatus according to the eighth aspect.
Figure 10:
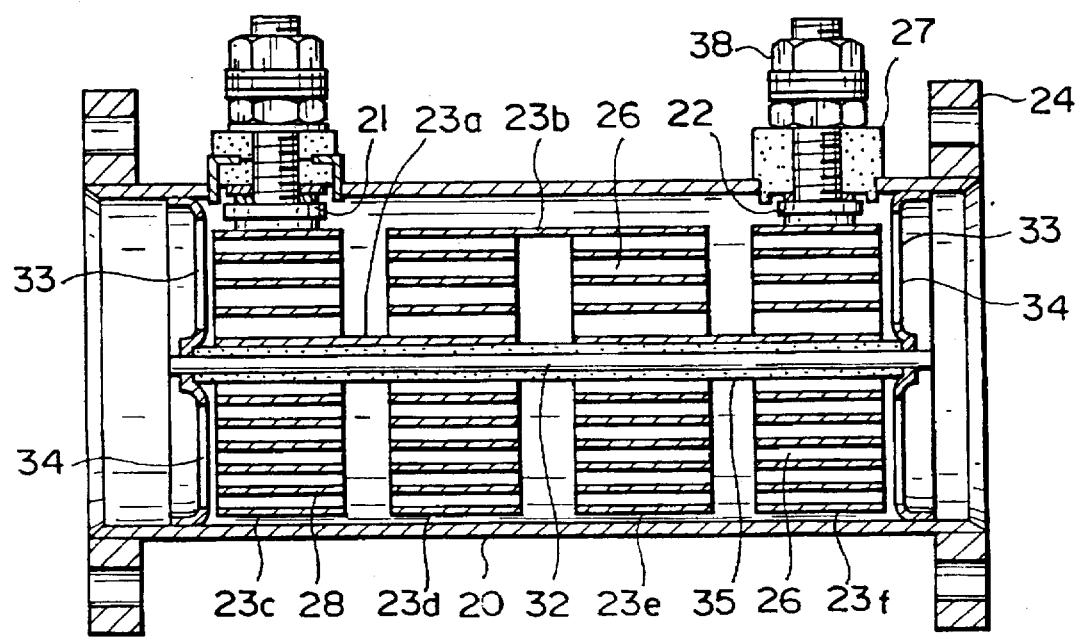
FIG. 10 is a side sectional view of the embodiment of the gas heating apparatus according to the eighth aspect.

Referring now to FIGS. 9 and 10, a description will be given of one embodiment according to the eighth aspect. In the embodiment, intermediate portions of two or more coupled respective exothermic bodies are mutually coupled by a rod 32, and both ends of the rod 32 are supported by plate-like holders 33 in which window holes 34 are provided. The rod 32 is made of metal to ensure strength. Insulating coating is applied to a periphery of the rod 32, and the insulating coating contacts the intermediate portions of the respective, exothermic bodies. The holder 33 is fitted with inner surfaces of both ends of a case. Structures other than that described hereinbefore are identical with those in the embodiment 2.

In the gas heating apparatus, two or more exothermic bodies are supported by the rod 32 for mutually coupling the center portions of the exothermic bodies, and the rod 32 is supported by the holders 33 at both ends of the case 20. As a result, it is possible to facilitate assembly of the exothermic body, and stabilize an assembled state, resulting in improved vibration resistance.

Embodiment 5

Figure 11:
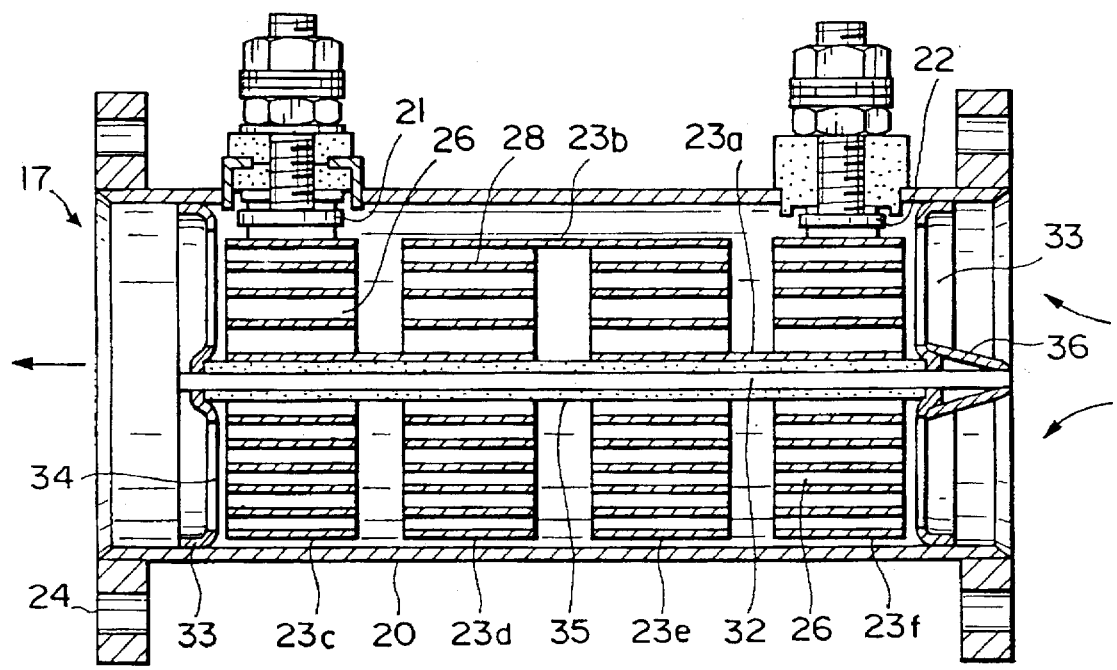
FIG. 11 is a side sectional view of an embodiment of a gas heating apparatus according to the ninth aspect.

Referring now to FIG. 11, a description will be given of one embodiment according to the ninth aspect. In the embodiment, a convex cone member 36 is provided on the air inflow side at a center portion of a holder 33 on the air inflow side of a gas heating apparatus described in the embodiment 4. In the gas heating apparatus, the inflow air can be introduced to a peripheral edge of an exothermic body along a peripheral surface of the cone member 36 so that the air uniformly passes through the entire gas heating apparatus 17, thereby enabling highly efficient heating.

That is, the air passing through an air pipe at an intermediate portion in the pipe typically has a higher flow velocity than that at a peripheral edge in the pipe. Thus, the air tends to be concentrated on the intermediate portion of the exothermic body after the air flows into the gas heating apparatus. In this case, however, the cone member 36 forcedly introduces the air flowing at the intermediate portion to edges. It is thereby possible to provide a uniform flow velocity distribution, and pass a great amount of air through the peripheral edge of the exothermic body having a specially large exothermic area.

In the illustrative embodiment, the cone member 36 is secured to the center portion of the holder 33. However, it must be noted that the same effect can be provided by disposing the cone member 36 by appropriate means at the center portion of an aperture on the air inflow side of the gas heating apparatus without the holder 33.

Embodiment 6

Figure 12:
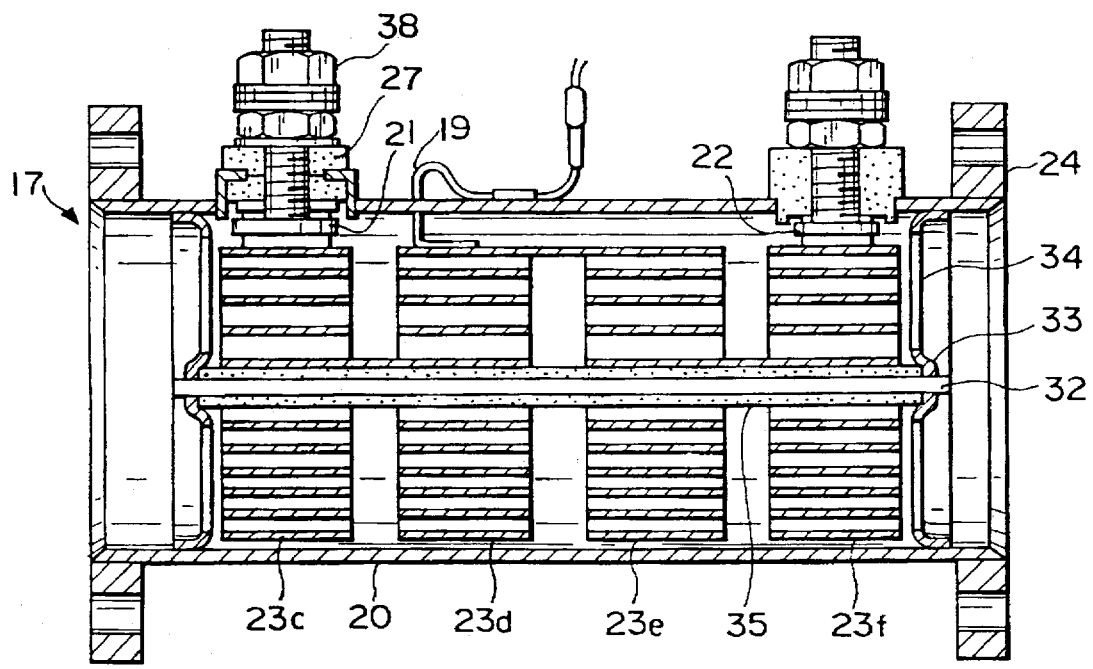
FIG. 12 is a side sectional view of an embodiment of a gas heating apparatus according to the third aspect.

Referring now to FIG. 12, a description will be given of another embodiment according to the eighth aspect. In the embodiment, a temperature sensor 19 is attached to an exothermic body. Structures other than the attached temperature sensor 19 are identical with those in the embodiment 4. With the temperature sensor 19, control can be made by a control unit for an appropriate temperature in a secondary air supplying apparatus depending upon a temperature detection of the exothermic body as described in the embodiment 1.

Embodiment 7

Figure 14:
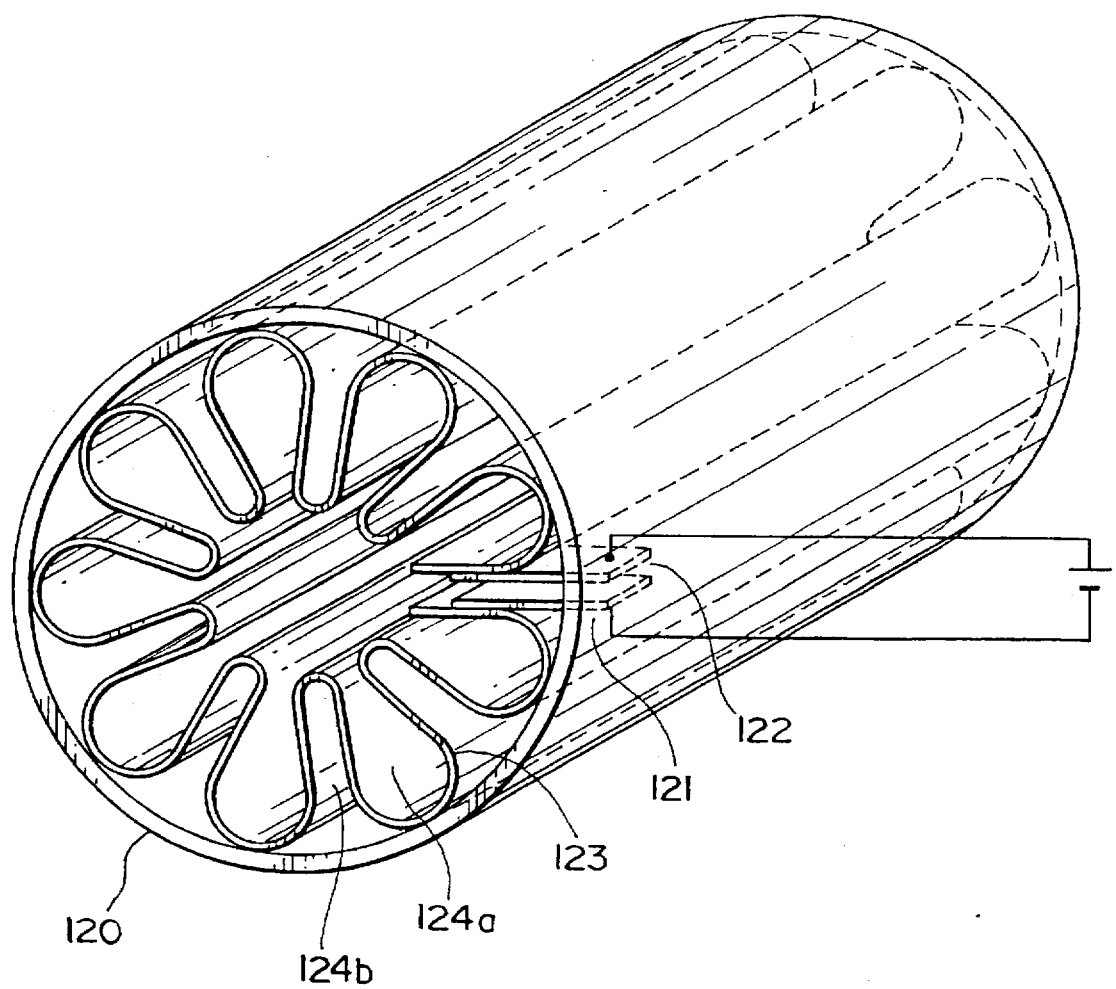
FIG. 14 is a perspective view of an embodiment of a gas heating apparatus according to the tenth aspect.

Referring now to FIG. 14, a description will be given of one embodiment of a gas heating apparatus according to the tenth aspect. Detailed structures such as a power source for the gas heating apparatus, or a structure and the operation of a secondary air supplying apparatus to which the gas heating apparatus is applied are identical with those in the embodiment 1. Therefore, the same reference numerals are used for citation as required, and drawings and descriptions thereof are omitted.

The gas heating apparatus in the embodiment 7 includes a case 120, electrodes 121 and 122, and an exothermic body 123. The case 120 is provided in a hollow and cylindrical form, and is connected to the course of a secondary air supply pipe 11. Though a flange coupling, a pipe inserting method or the like is employed as a typical connecting method, the connecting method is not shown in FIG. 14. The electrodes 121 and 122 are positive and negative electrodes corresponding to electrodes 21 and 22 in the embodiment 1, and are connected to the exothermic body 123. The case 120 contains the exothermic body 123, and the exothermic body 123 includes an electric resistor (for example, a stainless plate) which is provided in a substantially petal-like form having a predetermined resistance as shown in FIG. 14. Further, spaces 124a and 124b are formed on the inside and the outside of the exothermic body 123 provided in the substantially petal-like form to be defined as air paths.

In the gas heating apparatus, it is possible to improve a purification performance by increasing a temperature of secondary air as in the operation of the embodiment 1. In addition, there is an inherent effect in that it is possible to easily ensure an exothermic area to sufficiently heat the flowing air since there are the air paths on the both inside and outside of the substantially petal-like exothermic body 123.

Embodiment 8

Figure 15:
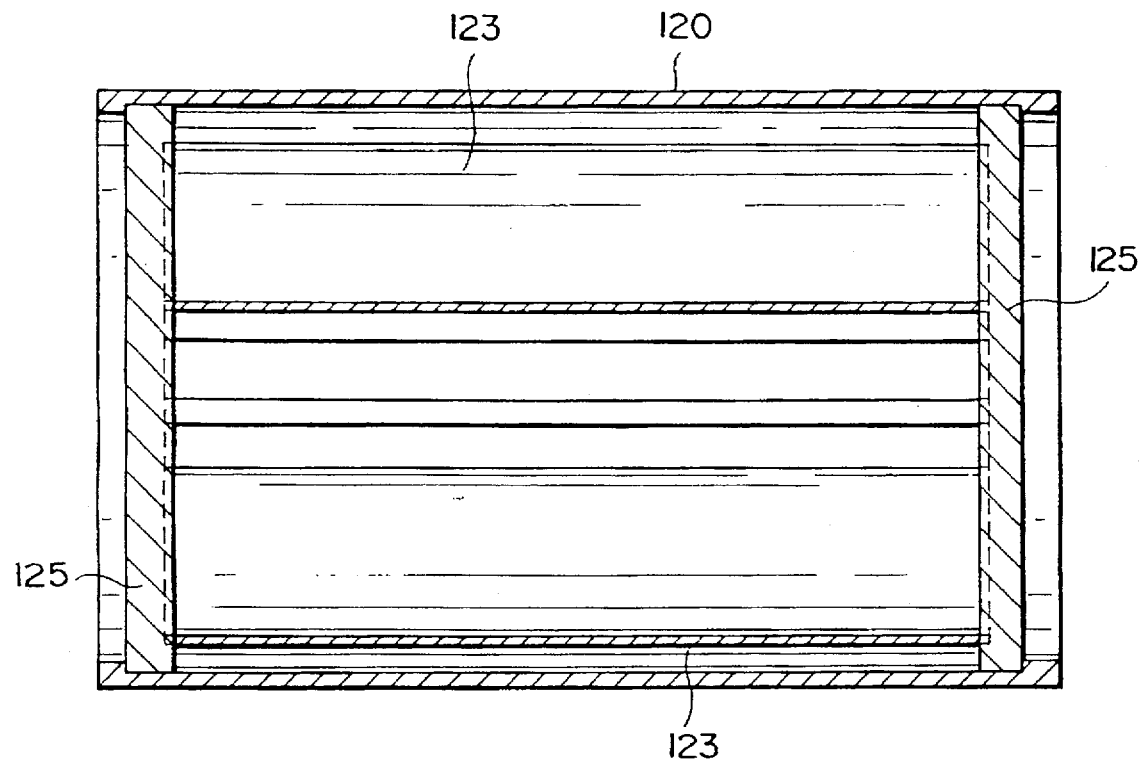
FIG. 15 is a side sectional view of an embodiment of a gas heating apparatus according to the eleventh aspect.
Figure 16:
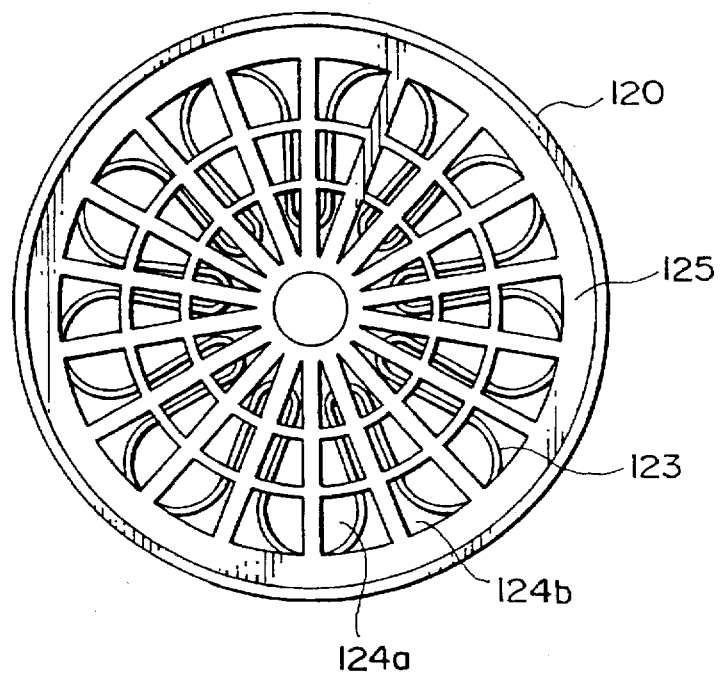
FIG. 16 is a front view of the embodiment of the gas heating apparatus according to the eleventh aspect.

Referring now to FIGS. 15 and 16, a description will be given of one embodiment of a gas heating apparatus according to the eleventh aspect. In the embodiment 8, a case 120 contains an exothermic body 123, and both ends of the exothermic body 123 are supported by and interposed between heat resisting insulators 125 having substantially honeycomb-like through-holes. A configuration of the exothermic body 123 is identical with that in the embodiment 7.

In the gas heating apparatus in the embodiment 8, the exothermic body 123 can be securely held by the heat resisting insulators 125 so that a substantially petal-like electric resistor forming the exothermic body 123 can have a more thin form than that in the embodiment 7 shown in FIG. 14 while maintaining a vibration resisting performance or the like. Hence, it is possible to increase a surface area and provide the same resistance by providing a more thin form for the exothermic body 123 and by, for example, extending an axial dimension. As a result, there are effects in that heating efficiency can be improved by increasing a contact area with the air, and the vibration resisting performance or the like can also be improved by deforming the electric resistor or by reducing vibration or the like.

Embodiment 9

Figure 17:
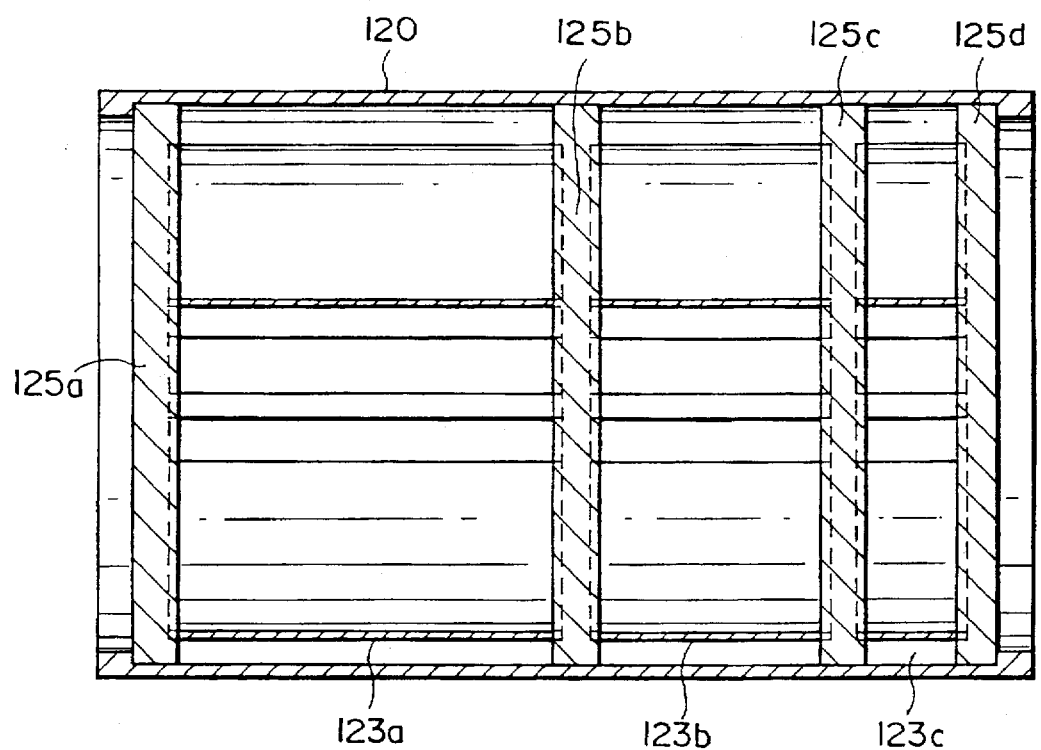
FIG. 17 is a side sectional view of an embodiment of a gas heating apparatus according to the twelfth aspect.
Figure 18:
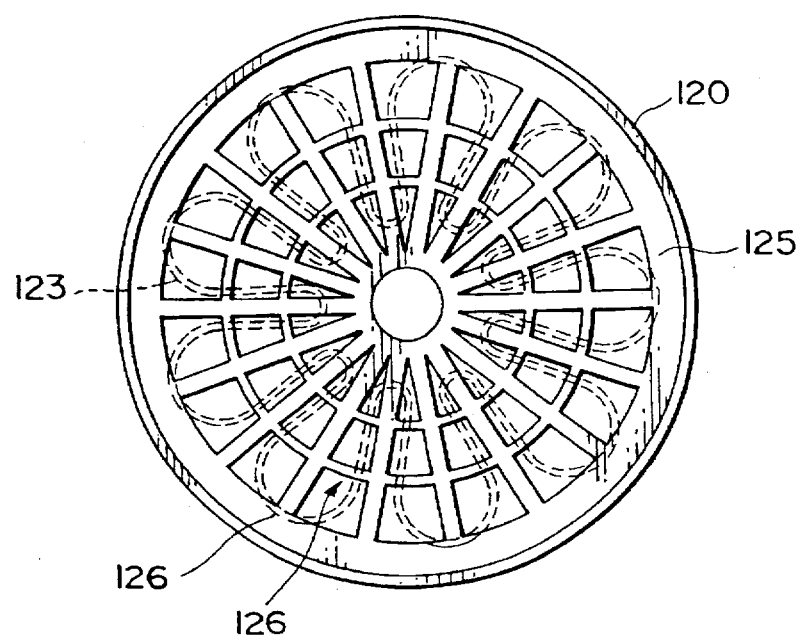
FIG. 18 is a front view of the embodiment of the gas heating apparatus according to the twelfth aspect.

Referring now to FIGS. 17 and 18, a description will be given of one embodiment of a gas heating apparatus according to the twelfth aspect. In the embodiment 9, a plurality of exothermic bodies 123a, 123b, and 123c having each different width (i.e., an axial length) are connected in series, and the respective exothermic bodies are supported at their end surfaces by heat resisting insulators 125a, 125b, 125c, and 125d.

FIG. 18 is a diagram of the gas heating apparatus in the embodiment as seen axially. An inserting groove 126 is provided in a side surface of each heat resisting insulator at a position where the exothermic body is positioned. Both ends of each exothermic body in each layer are inserted into and held by the inserting grooves 126 which are provided in the heat resisting insulators.

Though configurations of the respective exothermic bodies in the gas heating apparatus are identical with those in the embodiment 7, an electric resistor forming each exothermic body may have a thicker form than that in the embodiment 7. That is, a gas heating apparatus in FIG. 14 includes one exothermic body so that the electric resistor must be provided in a significantly thin form so as to ensure a predetermined heat value. In contrast with this, three exothermic bodies are employed in the embodiment 9 so that each exothermic body can be provided in a relatively thick form even if each exothermic body has the same total surface area, and predetermined electric resistance (of about 100 mΩ) can be provided as a whole.

In the embodiment 9, since each exothermic body has each different width, even in the same thickness, each resistance of each exothermic body can be expressed as the exothermic body 123a<the exothermic body 123b<the exothermic body 123c. Accordingly, even in the same power consumption (i.e., the same total resistance), each heat value of each exothermic body can be expressed as the exothermic body 123a<the exothermic body 123b<the exothermic body 123c. Thus, a temperature of the exothermic body 123c reaches the highest temperature so that secondary air can efficiently be heated.

In case the exothermic bodies having the same resistance are disposed in series with respect to a flowing direction of the air, a gas temperature on the upstream side (i.e., on the inlet side) of the gas heating apparatus is typically low. Thus, the air is sequentially heated when the air passes through the exothermic body, resulting in an increased temperature, At this time, a difference between the inlet gas temperature of each exothermic body and a temperature of each exothermic body itself more decreases as the air further travels toward later stages. That is, as the temperature difference more decreases, heat conduction from the exothermic body to the gas more decreases and efficiency of heat transfer is more reduced so that the exothermic body on the downstream side can not be used effectively. However, in the gas heating apparatus in the embodiment, since heat generation of the exothermic body on the downstream side is more enhanced, it is possible to enhance the efficiency of heat transfer, in particular, a response characteristic (i.e., a temperature rising velocity). In the embodiment, though magnitude of the resistance of each exothermic body is defined as the exothermic body 123a<the exothermic body 123b<the exothermic body 123c, it must be noted that the present invention should not be limited to this order.

Further, in the gas heating apparatus, each exothermic body is partially inserted into and fixed by a substantially honeycomb-like heat resisting insulator. Consequently, the exothermic body can resist vibration and impact even if the exothermic body is provided in a more thin form so as to increase its surface area. As a result, there is an effect in that heating efficiency can further be improved.

Embodiment 10

Figure 19:
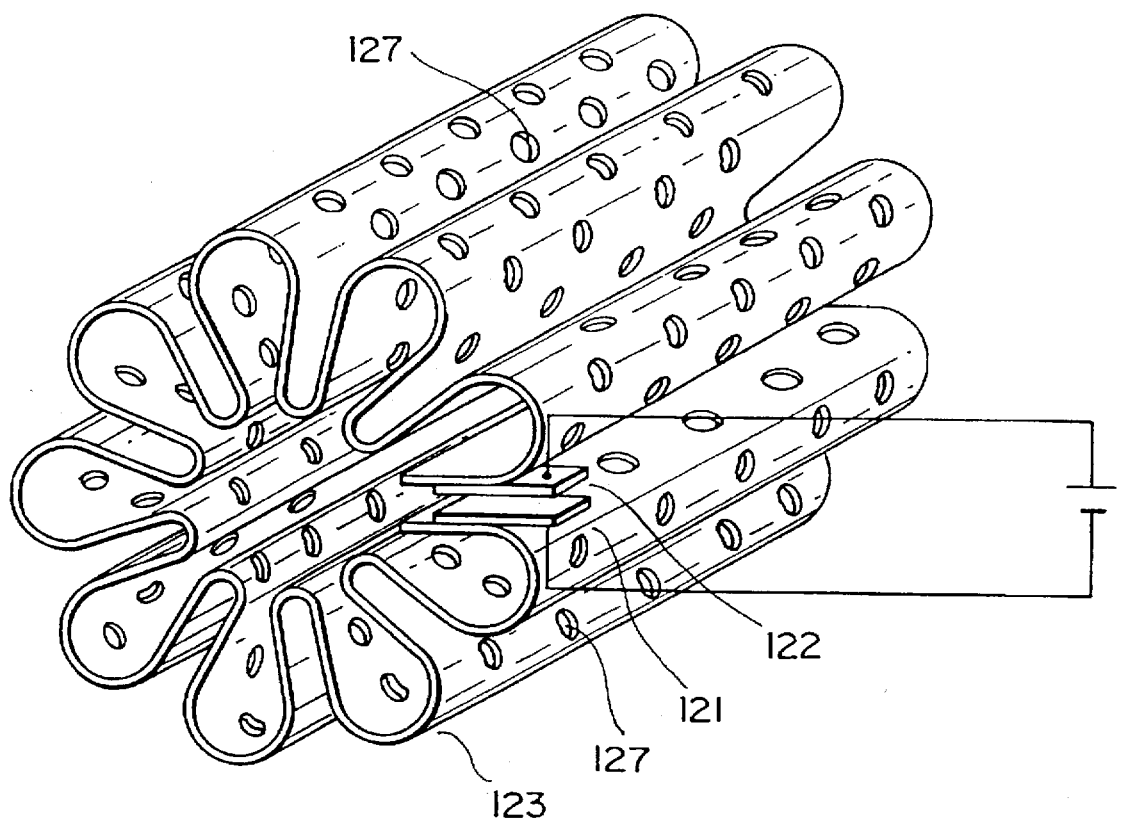
FIG. 19 is a perspective view of an embodiment of a gas heating apparatus according to the thirteenth aspect.

Referring now to FIG. 19, a description will be given of one embodiment of a gas heating apparatus according to the thirteenth aspect. In the embodiment 19, pores 127 pass through an entire surface of an exothermic body 123. Other structures of the gas heating apparatus are identical with those in the embodiment 7, and drawings and descriptions thereof are omitted. In the gas heating apparatus, a gas passes the exothermic body 123 through the pores 127 in a substantially turbulent condition. As a result, efficiency of heat transfer is improved to enable more efficient heating of secondary air.

Embodiment 11

Figure 20:
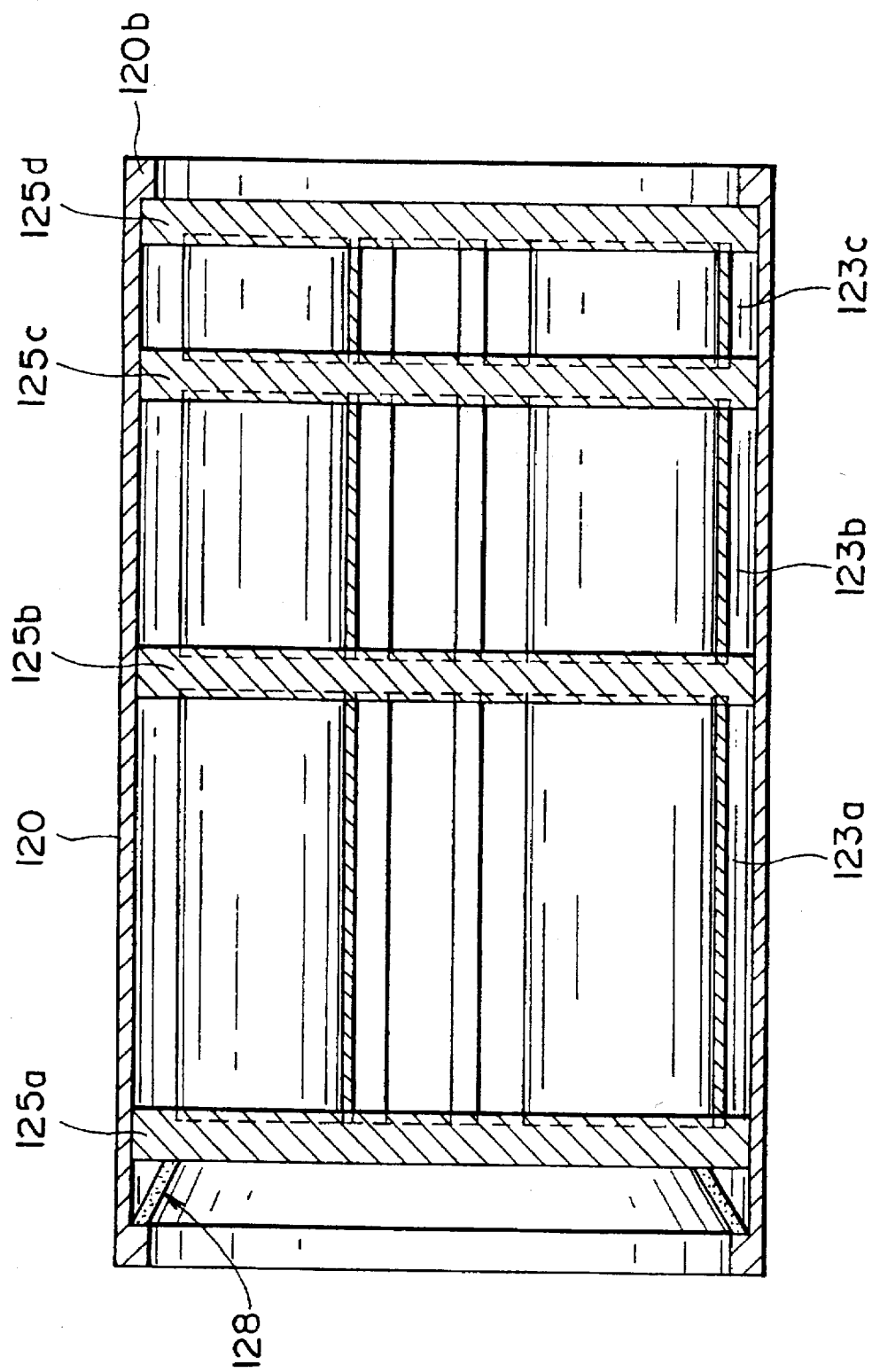
FIG. 20 is a side sectional view of an embodiment of a gas heating apparatus according to the fourteenth aspect.

Referring now to FIG. 20, a description will be given of one embodiment of a gas heating apparatus according to the fourteenth aspect. In the embodiment 11, the gas heating apparatus includes exothermic bodies 123a, 123b, 23c, and 123d whose both ends are supported by heat resisting insulators 125a, 125b, 125c, and 125d, and which are electrically connected in series. The heat resisting insulator 125a is positioned on the single end side of the gas heating apparatus to contact a projecting portion of a case 120, and for example, a conical spring-like elastic body 128 is interposed between the heat resisting insulator 125a and the projecting portion of the case 120.

In the gas heating apparatus, since each exothermic body is elastically secured in an axial direction in the case 120, it is possible to smoothly remove axial chattering, and absorb axial expansion due to thermal expansion of each exothermic body. Hence, it is possible to protect the exothermic body from the chattering or the thermal stress so as to enhance a lifetime or the like thereof. The elastic body 128 is preferably mounted on the gas inlet side, that is, on the lower gas temperature side.

Embodiment 12

Figure 21:
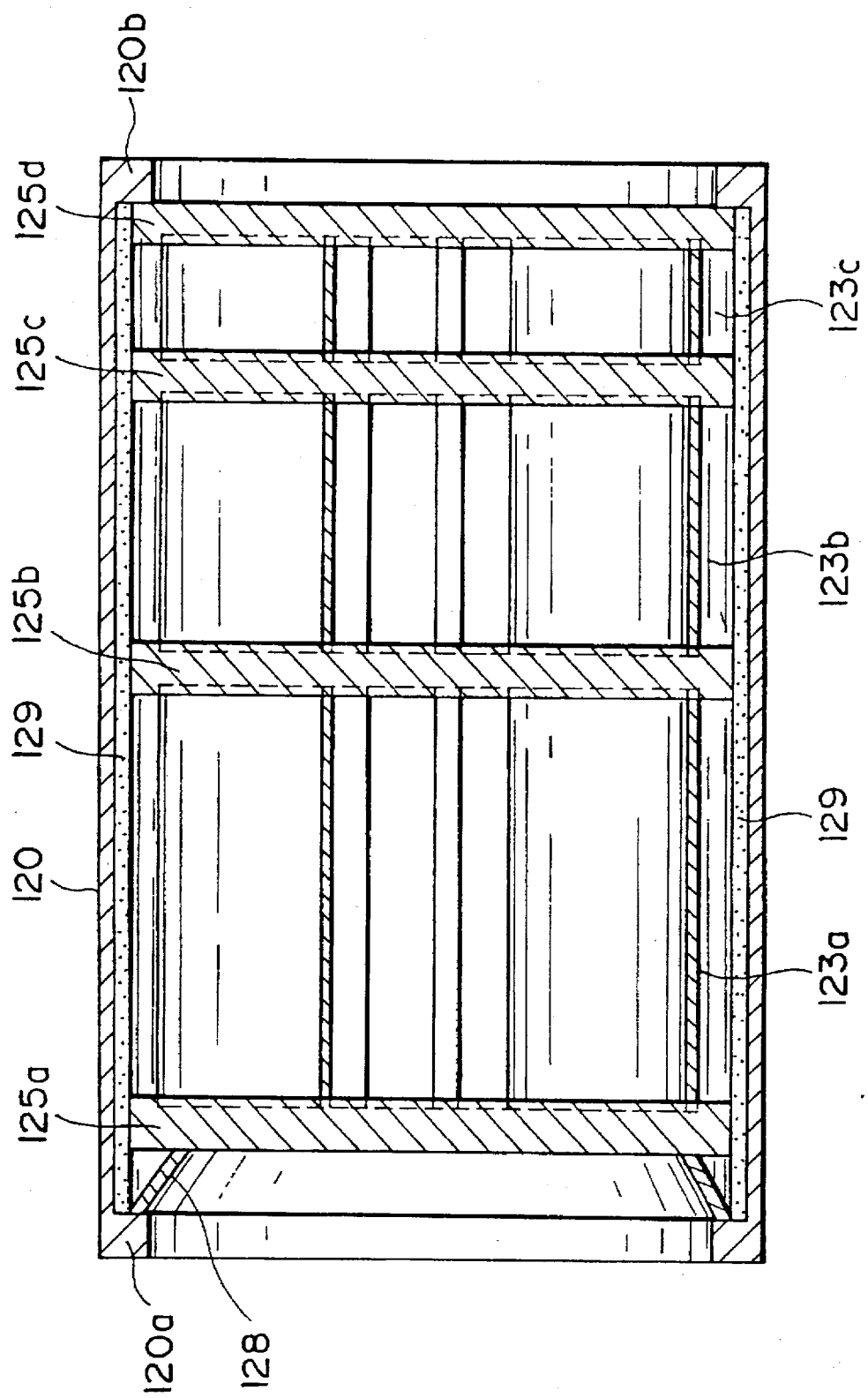
FIG. 21 is a side sectional view of an embodiment of a gas heating apparatus according to the fifteenth aspect.

Referring now to FIG. 21, a description will be given of one embodiment of a gas heating apparatus according to the fifteenth aspect. In the embodiment 12, an inorganic fiber-like heat resisting insulator 129 is interposed between outer peripheries of each exothermic body and heat resisting insulators and an inner periphery of a case 120. In this case, the heat resisting insulator 129 is provided for the inner wall of the case 120 in a substantially cylindrical fashion.

In the gas heating apparatus, the heat resisting insulator is interposed to cut off heat transfer from the exothermic body on the inside of the case 120 so as to reduce the heat transfer to the case 120. As a result, it is possible to enhance efficiency of heat transfer to secondary air so as to enable more efficient heating.

Embodiment 13

Figure 22:
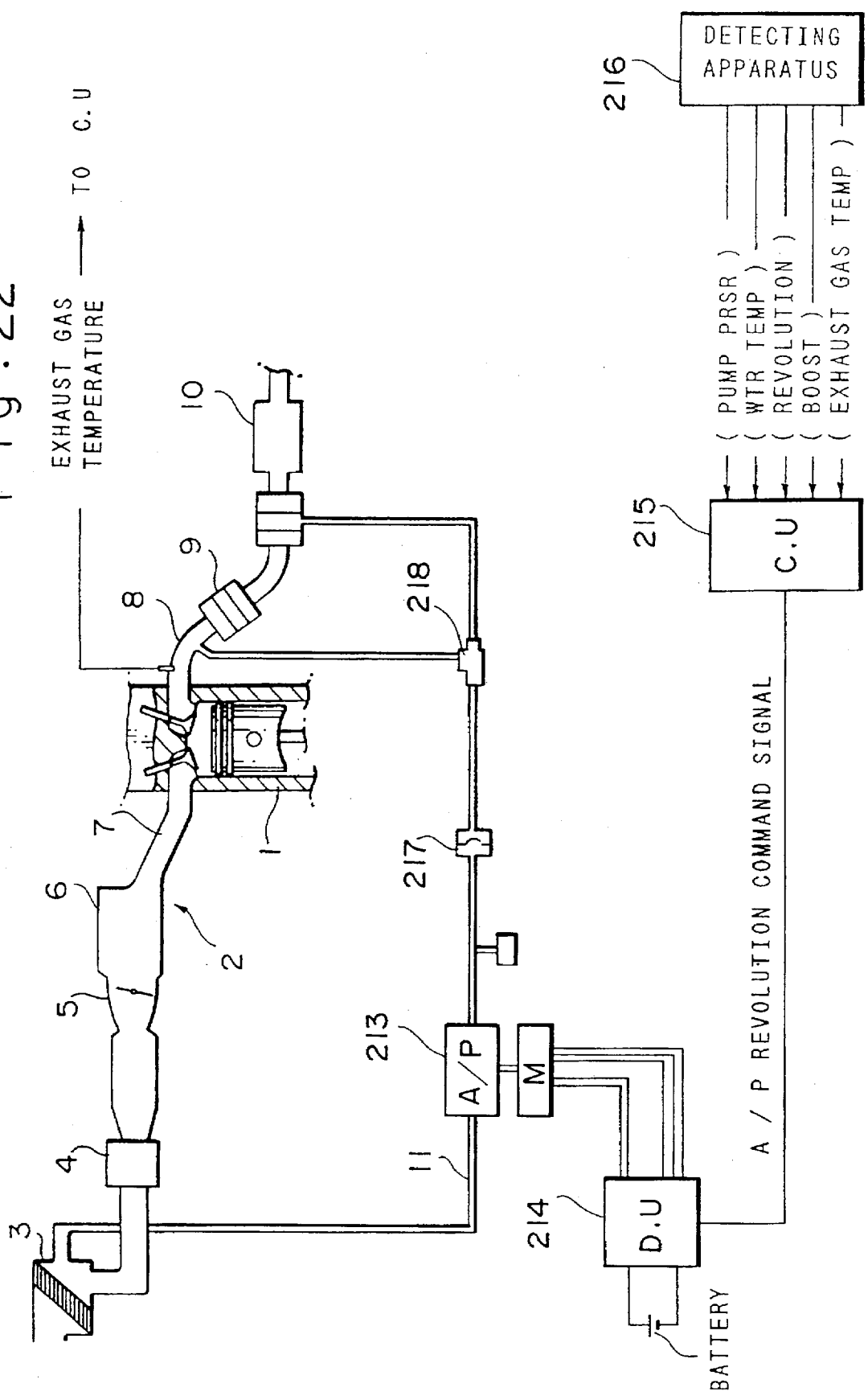
FIG. 22 is a diagram showing an embodiment of a secondary air supplying apparatus according to the sixteenth and seventeenth aspects, and an intake/exhaust system of an internal combustion engine to which the secondary air supplying apparatus is applied.
Figure 23:
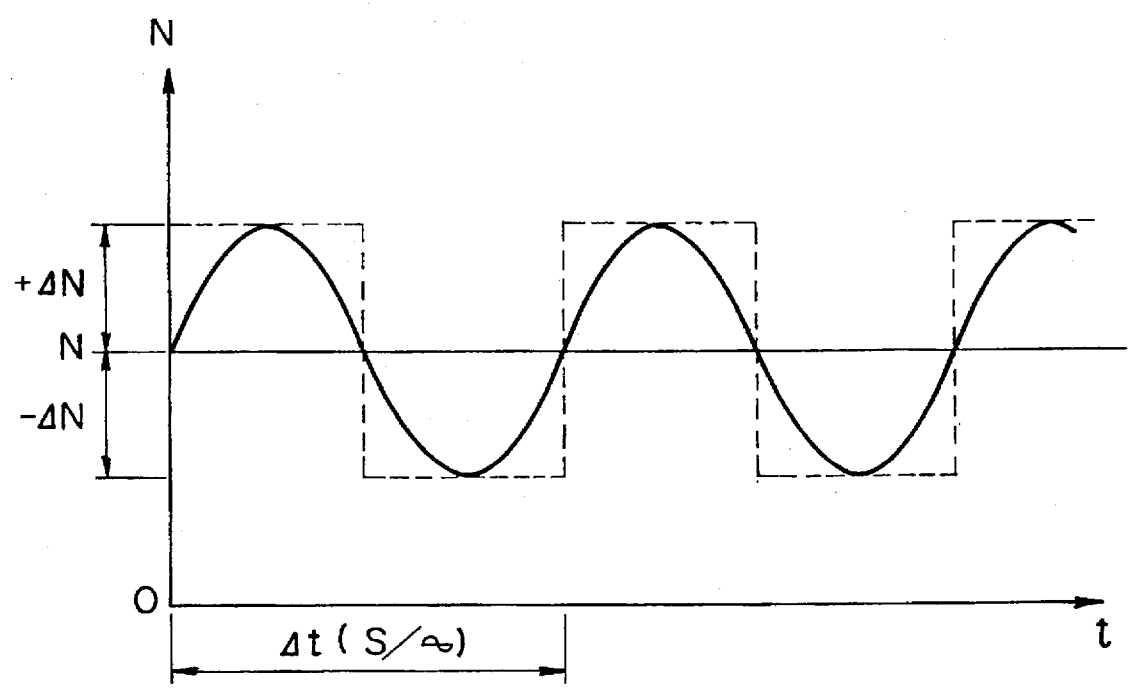
FIG. 23 is a diagram showing an illustrative control pattern of secondary air flow control in the embodiment according to the sixteenth and seventeenth aspects.

Referring now to FIGS. 22 and 23, a description will be given of one embodiment according to the sixteenth aspect and the seventeenth aspect. FIG. 22 shows a secondary air supplying apparatus in the embodiment. In FIG. 22, reference numeral 213 is a motor pump (a feeder) including a motor having a drive unit such as a brushless motor, 214 is motor drive unit for controlling the motor pump 213, 215 is a computer unit for outputting a command signal to the motor drive unit 214 by deciding an operating state of an internal combustion engine, 216 is an operating state detecting apparatus, 217 is a check valve for preventing a counter-flow of an exhaust gas, and 218 is a distributing valve used to introduce air into a plurality of portions. However, it is to be noted that the distributing valve is unnecessary if the air is fed to only one portion. An intake/exhaust system of the internal combustion engine to which the apparatus is applied has the same structure as that in the embodiment 1 (FIG. 3). Therefore, the same reference numerals are used for the structures in FIG. 22, and descriptions thereof are omitted. In this case, unlike the embodiment 1, two catalytic apparatus 9 are provided in series.

It is possible to vary the revolution of the motor drive unit 214 for driving the motor pump 213 with constant amplitude and for a constant period. The variation pattern is shown in FIG. 23. In FIG. 23, the transverse axis defines a time and the ordinate axis defines the revolution, a variation period is $\Delta t(s/\infty)$, and variation amplitude has vertical amplitude of $\Delta N$ with a certain control revolution N as a center and is appropriately controlled by the motor drive unit 214. The control pattern may be described along either the solid line or the dotted line in FIG. 23.

A description will now be given of the operation. In the secondary air supplying apparatus, even under a condition that a function of the catalytic apparatus 9 is easily degraded, it is possible to forcedly supply the secondary air by the motor pump 213, and increase oxygen concentration in the exhaust gas so as to exhibit an enhanced purification function. This is because the catalytic apparatus 9 more hardly exhibits the exhaust gas purification function (of removing HC, CO or the like) typically as an exhaust gas temperature becomes lower, and the purification function is more reduced as the oxygen concentration in the exhaust gas is more reduced. The catalytic apparatus 9 can not exhibit sufficient reaction and richer HC, CO and the like are discharged, in particular, in a state where an internal combustion engine body 1 is not in sufficient warm-up, such as a state immediately after starting, a state where the internal combustion engine body 1 is not in warm-up due to a low temperature of external air, or a state where an intake fuel-air mixture of the engine 1 contains excessive fuel (i.e., rich fuel). However, in the secondary air supplying apparatus in the embodiment 13, the motor pump 213 can supply the secondary air to mix the exhaust gas with oxygen so as to activate catalytic reaction even in the above operating conditions.

In addition, the motor pump 213 is controlled by the motor drive unit 214 so as to provide appropriate amplitude and a constant period in the revolution. Hence, variation in the secondary air introduced into the exhaust manifold 8 is repeated similarly in an appropriate flow range and for a constant period. As a result, it is possible to improve purification efficiency of HC, CO or the like since the catalytic apparatus 9 is alternately in an oxygen rich state and in an oxygen short state for a constant period.

Embodiment 14

Figure 24:
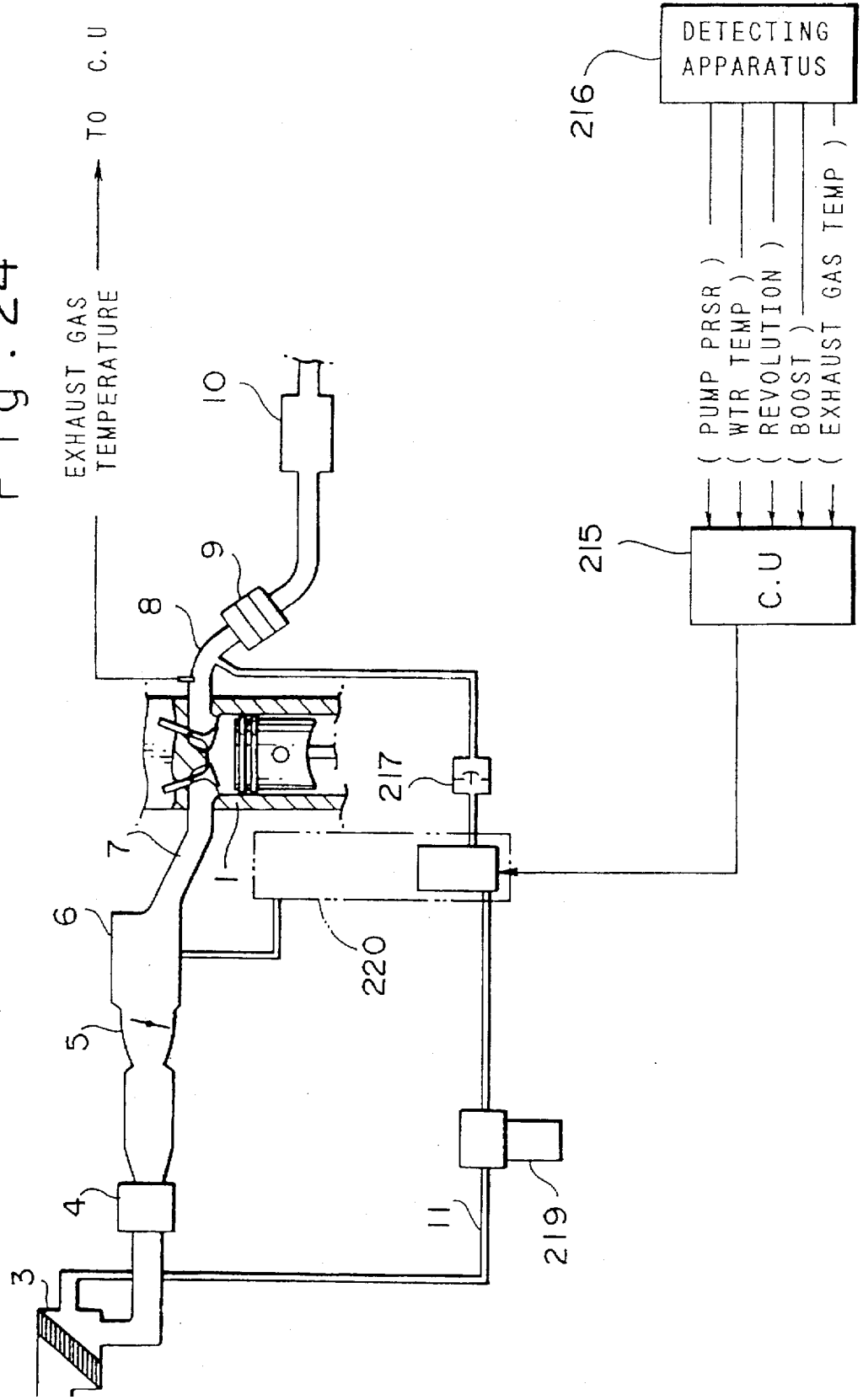
FIG. 24 is a diagram showing an embodiment of a secondary air supplying apparatus according to the eighteenth aspect, and an intake/exhaust system of an internal combustion engine to which the secondary air supplying apparatus is applied.
Figure 25:
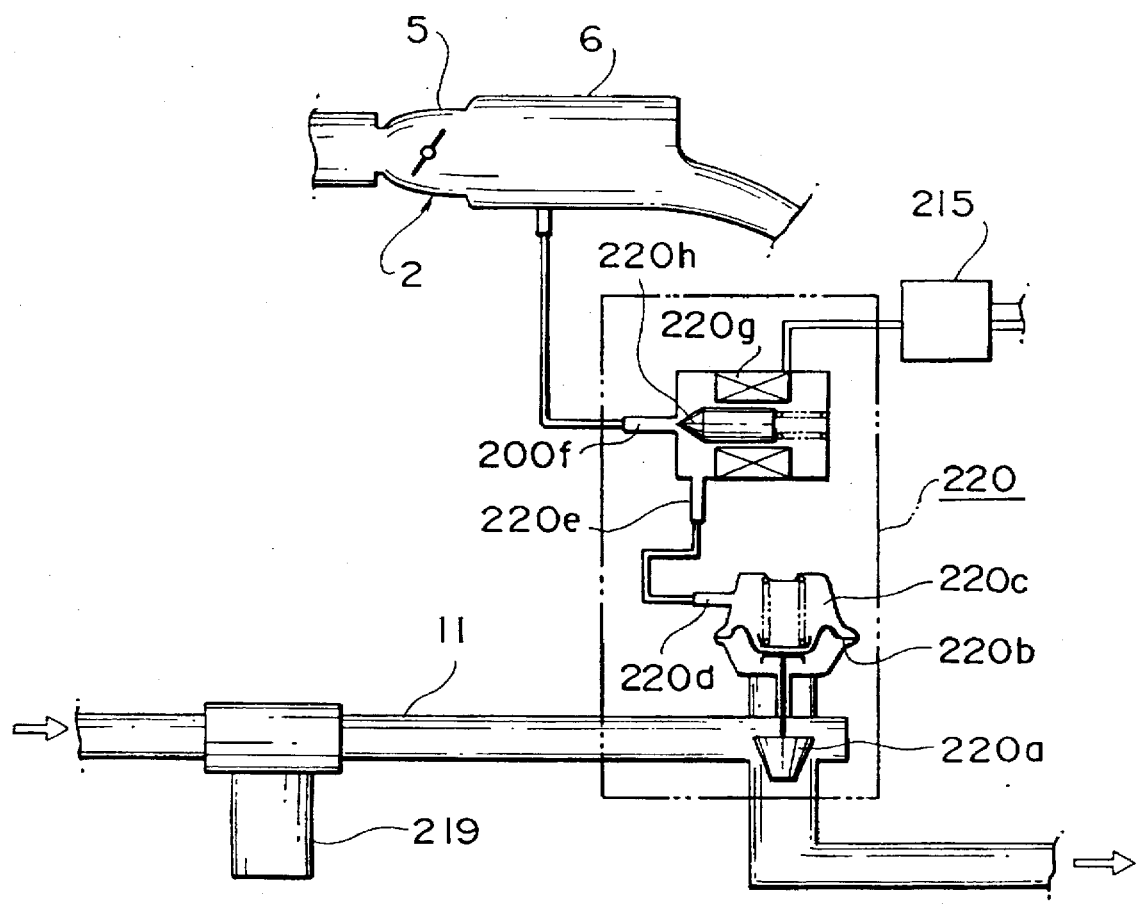
FIG. 25 is a diagram showing one embodiment of a flow control unit according to the eighteenth aspect.
Figure 26:
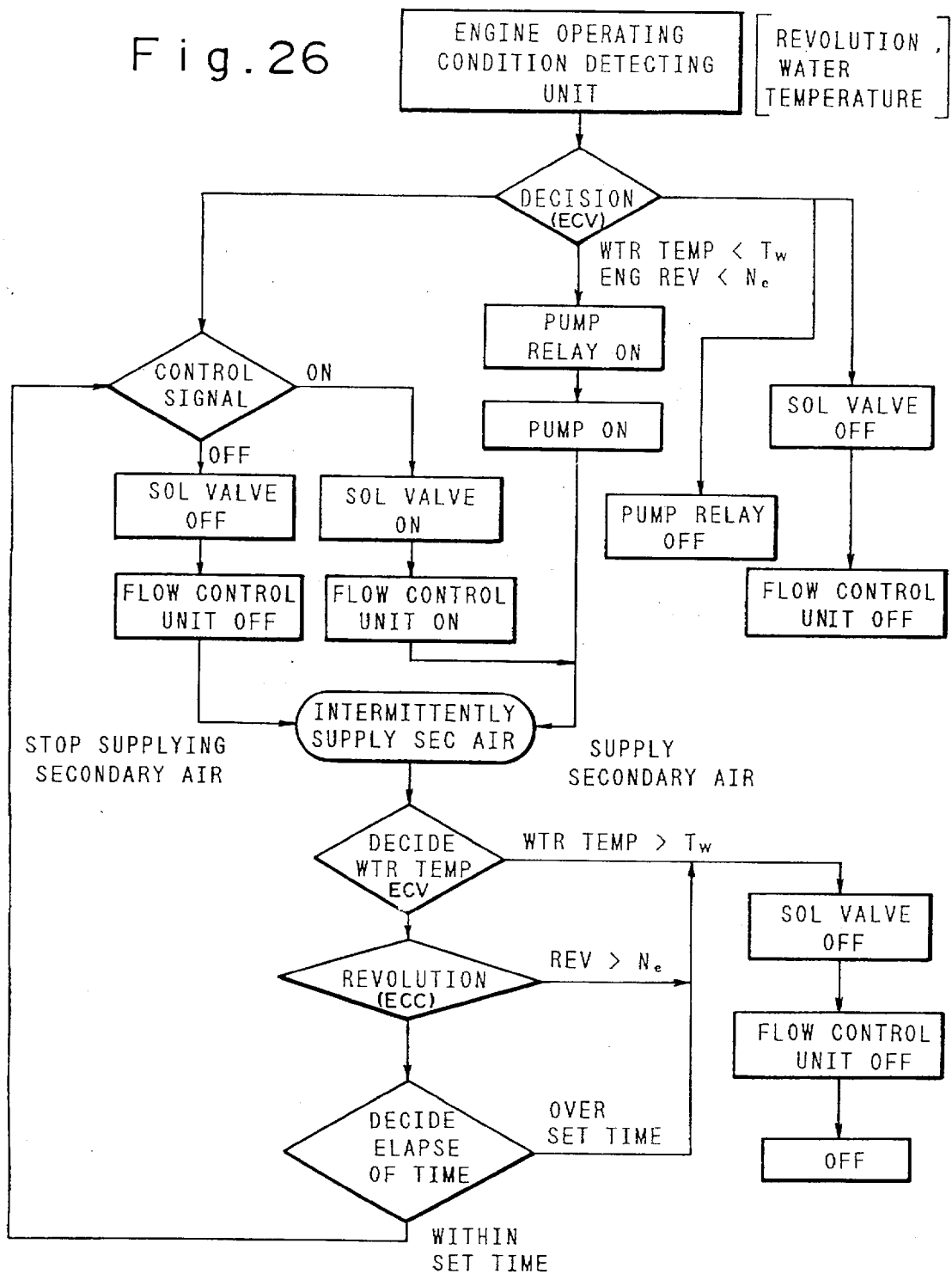
FIG. 26 is a flowchart illustrating the operation of the embodiment of the secondary air supplying apparatus according to the eighteenth aspect.

Referring now to FIGS. 24, 25, and 26, a description will be given of one embodiment according to the eighteenth aspect. The embodiment 13 has been described with reference to a secondary air supplying apparatus employing a motor with a drive unit represented by a brushless motor. The embodiment 14 is discussed with reference to another secondary air supplying apparatus employing a motor without the drive unit, and a structure thereof is described referring to FIG. 24. In FIG. 24, reference numeral 219 means a mechanical or electrical pump disposed on a by-pass line for introducing secondary air, and 220 is a flow control unit controlled by a computer unit 215 for deciding depending upon a signal from a sensor detecting an operating state of an internal combustion engine body 1.

Referring now to FIG. 25, a description will be given of a specific embodiment of the flow control unit 220. FIG. 25 shows the flow control unit 220 including a typical pneumatic valve and a small solenoid valve. In FIG. 25, reference numeral 220a means a pneumatic valve serving as a path on-off valve, 220b is a diaphragm of the pneumatic valve, 220c is a negative pressure chamber of the pneumatic valve, 220d, 220e, and 220f are nipples respectively connected through rubber tubes, 220g is a coil of the small solenoid valve, and 220h is a plunger of the small solenoid valve.

The flow control unit 220 shown in FIG. 25 is driven by a negative pressure source of a surge tank 6. The respective nipples 220d to 220f are connected as shown in FIG. 25, and an ON-OFF operation of the plunger 220h of the solenoid valve can vary pressure in the negative pressure chamber 220c of the pneumatic valve. Therefore, divergence of the path on-off valve 220a is controlled according to variation in volume of the negative pressure chamber 220c such that an amount of air discharged from the pump 219 has a constant period and constant amplitude, and the air is supplied as secondary air to an exhaust pipe. The ON-OFF operation of the solenoid valve is controlled by the computer unit 215 depending upon decision of the operating state of the engine, and is shown in a flowchart of FIG. 26.

Embodiment 15

Figure 27:
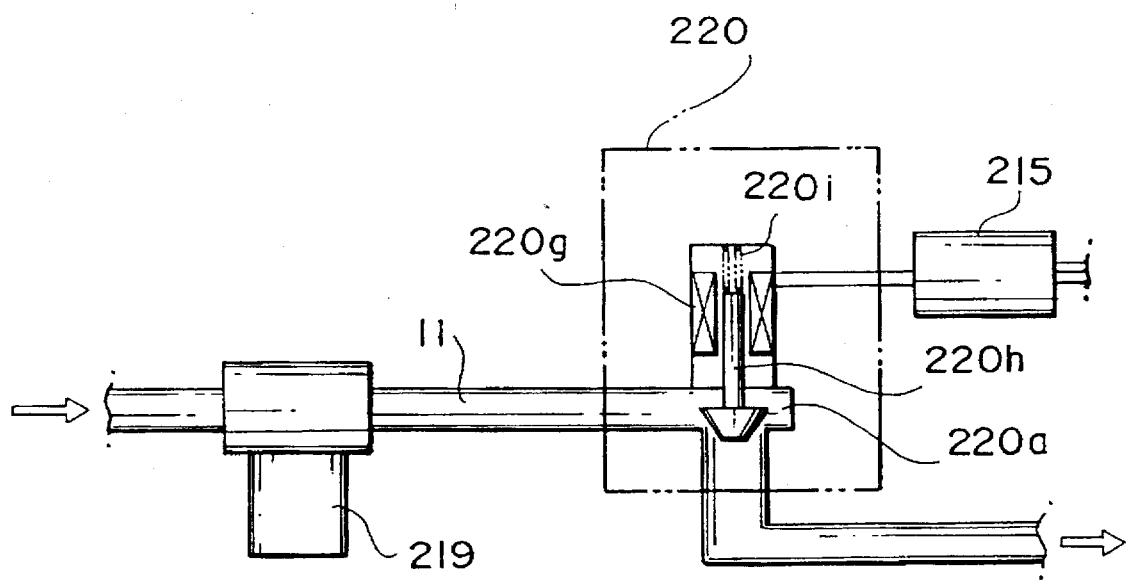
FIG. 27 is a diagram showing another embodiment of the flow control unit according to the eighteenth aspect.

Referring now to FIG. 27, a description will be given of another embodiment according to the eighteenth aspect. In a flow control unit 220 in the embodiment 15, a path on-off valve 220a is mounted at a distal end of a plunger 220h. Reference numeral 220i means a spring. A computer unit 215 detects an operating state of an engine 1 to control a conducting signal fed to a coil 220g. For example, when the coil 220g is energized, the plunger 220h is sucked to extend divergence of the path on-off valve 220a. Control is made to gradually vary a duty ratio (a ratio of ON time to OFF time) so as to periodically vary the divergence of the path on-off valve 220a. In the embodiment shown in FIG. 27, though the flow control unit 220 is mounted on the downstream of a pump 219, it must be noted that the flow control unit may be mounted on the upstream thereof.

Embodiment 16

Figure 28:
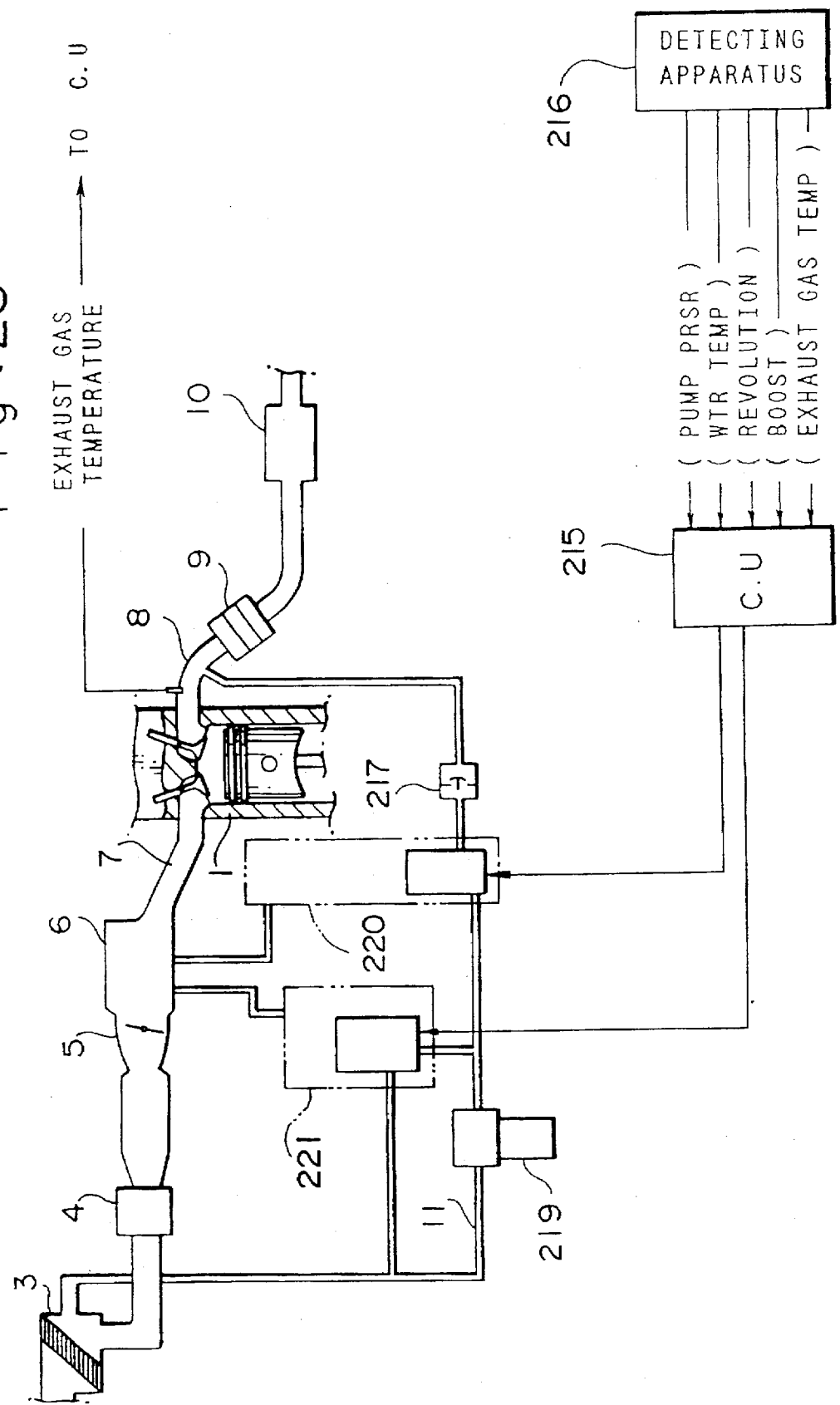
FIG. 28 is a diagram showing an embodiment of a secondary air supplying apparatus according to the nineteenth aspect, and an intake/exhaust system of an internal combustion engine to which the secondary air supplying apparatus is applied.

Referring now to FIG. 28, a description will be given of one embodiment according to the nineteenth aspect. As shown in FIG. 28, an apparatus in the embodiment 16 is provided with a flow control unit 220 which is identical with that in the embodiment 14, and a relief mechanism 221 is mounted between the flow control unit 220 and a pump 219. The relief mechanism 221 is controlled by a computer unit 215, and will specifically be described hereinafter.

Figure 29:
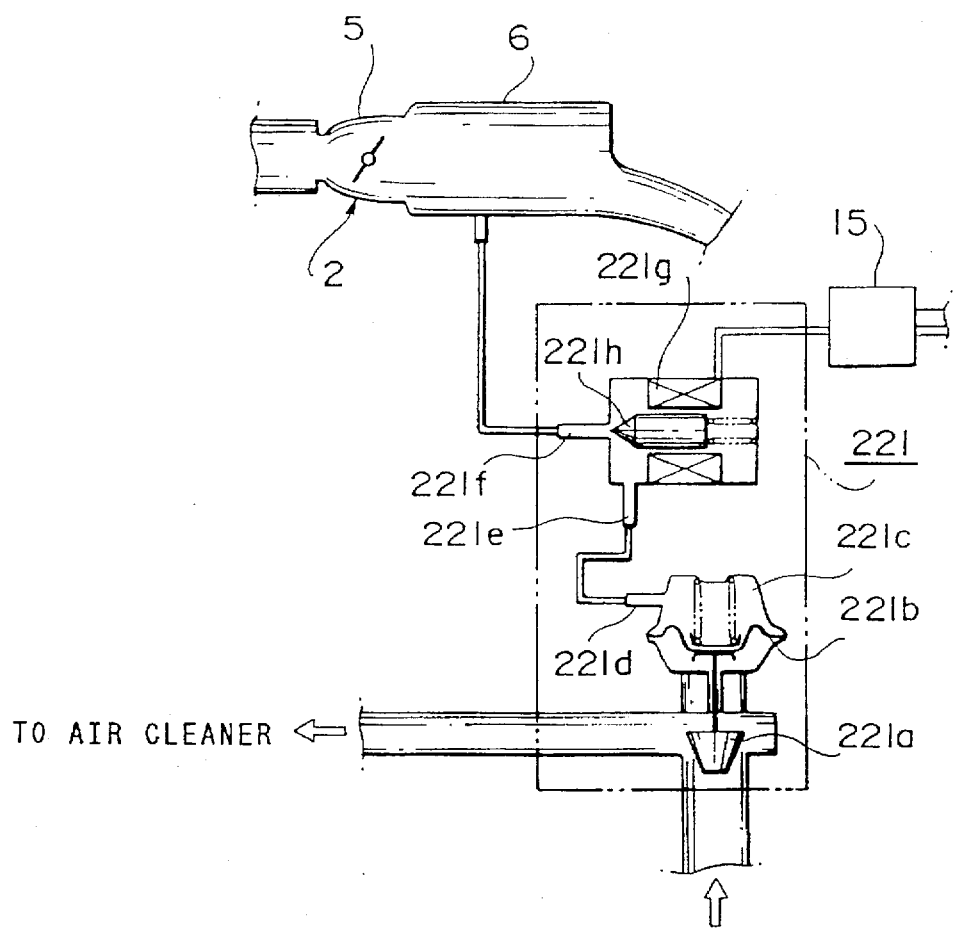
FIG. 29 is a diagram showing one embodiment of a relief mechanism according to the nineteenth aspect.

FIG. 29 shows the relief mechanism 221 including a typical pneumatic valve and a small solenoid valve. In FIG. 29, reference numeral 221a is a path on-off valve of the pneumatic valve, 221b is a diaphragm of the pneumatic valve, 221c is a negative pressure chamber of the pneumatic valve, 221d, 221e, and 221f are nipples respectively connected through rubber tubes, 221g is a coil of the small solenoid valve, and 221h is a plunger of the small solenoid valve.

The flow control unit 221 shown in FIG. 29 is driven by a negative pressure source of a surge tank 6. The respective nipples are connected as shown in the drawing, and an ON-OFF operation of the plunger 221h of the solenoid valve can vary pressure in the negative pressure chamber 221c. Therefore, divergence of the path on-off valve 221a is controlled according to variation in volume of the negative pressure chamber 221c so that the air discharged from the pump 219 is relieved to an air cleaner 3.

Hence, in the secondary air supplying apparatus, it is possible to improve security and durability of the apparatus by avoiding excessive pressure rising on the discharging side of the pump 219 in a closing state of the flow control unit 220. Further, the ON-OFF operation of the solenoid valve is controlled by the computer unit 215 depending upon decision of an operating state of an internal combustion engine body 1.

Embodiment 17

Figure 30:
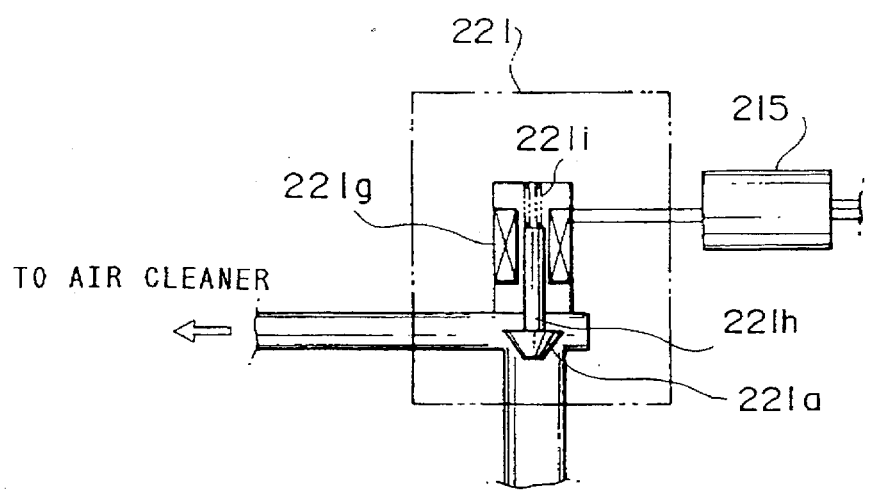
FIG. 30 is a diagram showing another embodiment of the relief mechanism according to the nineteenth aspect.

A description will now be given of another embodiment according to the nineteenth aspect. FIG. 30 shows an alternative embodiment of a relief mechanism 221. In the relief mechanism 221, a path on-off valve 221a is mounted at a distal end of a plunger 221h. Further, reference numeral 221i is a spring.

In the embodiment 17, when a flow control unit 220 is in a valve opening state, a computer unit 215 controls a conducting signal fed to a coil 221g. For example, when the coil 221g is energized, the plunger 221h is sucked to open the path on-off valve 221a, resulting in relief to an air cleaner 3.

Embodiment 18

Figure 31:
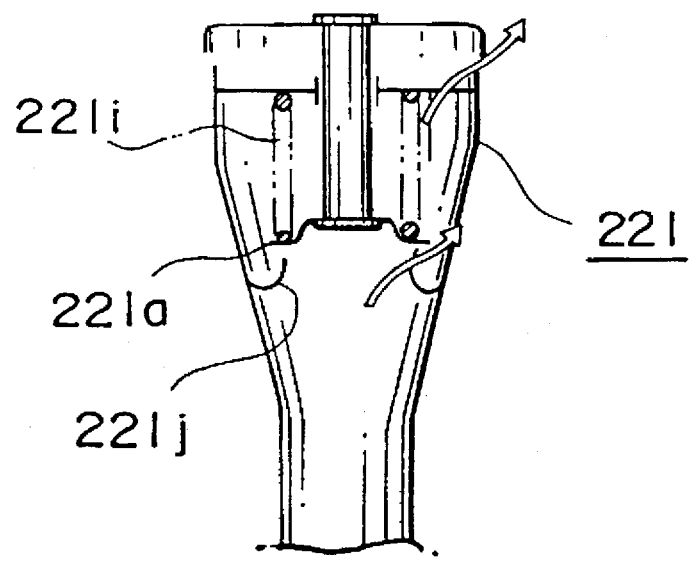
FIG. 31 is a diagram showing another embodiment of the relief mechanism according to the nineteenth aspect.

Referring now to FIG. 31, a description will be given of another embodiment according to the nineteenth aspect. A relief mechanism 221 in the embodiment 18 is provided with a path 221j which is opened and closed by a path on-off valve 221a and is communicated with external air. Reference numeral 221i is a spring urging the on-off valve in a valve opening direction.

In the embodiment, when a flow control unit 220 is closed and a pump 219 is in an operating state, force is applied in the valve opening direction of the on-off valve 221a if pressure between the flow control unit 220 and the pump 219 reaches high pressure. Subsequently, when the force becomes greater than the urging force of the spring 221i, the valve is opened so that high-pressure secondary air is relieved to the atmosphere through an air cleaner 3.

Embodiment 19

Figure 32:
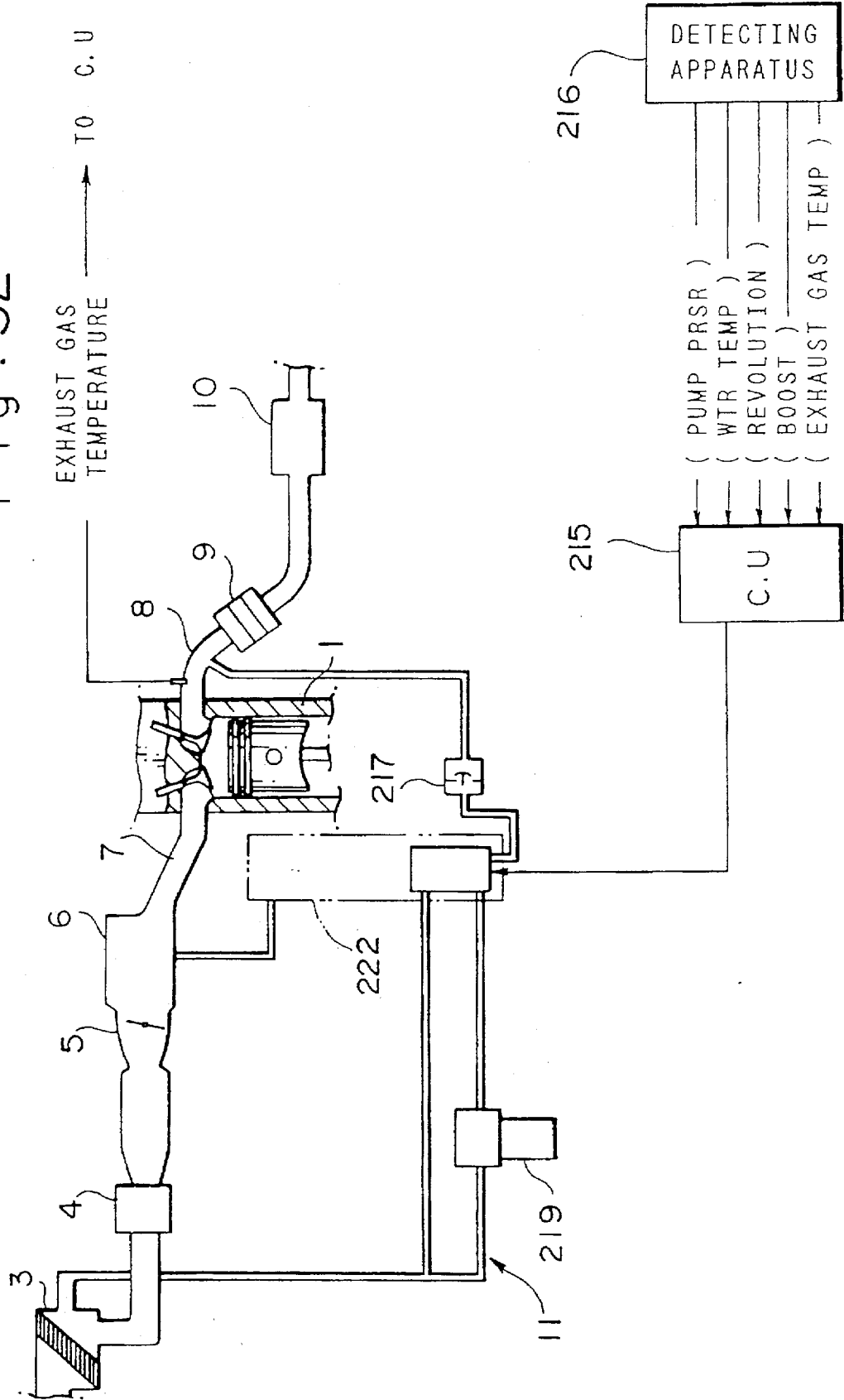
FIG. 32 is a diagram showing an embodiment of a secondary air supplying apparatus according to the twentieth aspect, and an intake/exhaust system of an internal combustion engine to which the secondary air supplying apparatus is applied.

Referring now to FIG. 32, a description will be given of one embodiment according to the twentieth aspect. A secondary air supplying apparatus in the embodiment 19 is provided with a flow control-relief integration unit 222 having a function which can be provided by integrally forming a flow control unit 220 in the embodiment 14 with a relief mechanism 221 in the embodiment 16. The flow control-relief integration unit 222 is controlled by a computer unit 215, and will specifically be described hereinafter.

Figure 33:
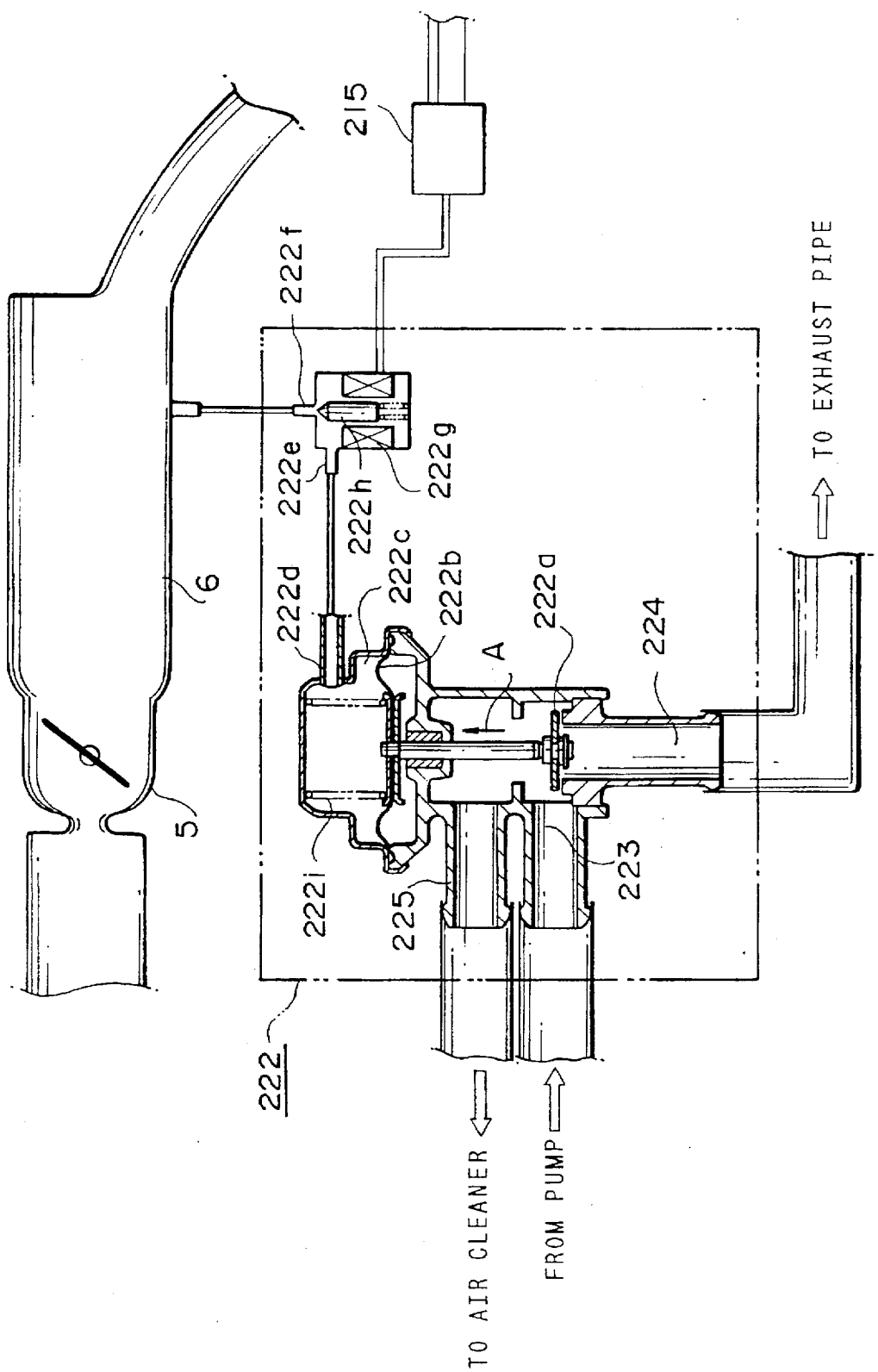
FIG. 33 is a diagram showing one embodiment of a flow control-relief integration unit according to the twentieth aspect.

FIG. 33 shows the flow control-relief integration unit 222 including a pneumatic valve and a small solenoid valve. Reference numeral 222a is a path switching valve, 222b is a diaphragm of the pneumatic valve, 222c is a negative pressure chamber of the pneumatic valve, 222d, 222e, and 222f are nipples respectively connected through rubber tubes, 222g is a coil of the small solenoid valve, 222h is a plunger of the small solenoid valve, and 222i is a spring of the pneumatic valve.

The flow control-relief integration unit 222 in the embodiment 19 is driven by a negative pressure source of a surge tank 6. The respective nipples are connected as shown in the drawing, and an ON-OFF operation of the plunger 222h of the solenoid valve can vary pressure in the negative pressure chamber 222c. Therefore, the operation of the path switching valve 222a is controlled according to variation in volume of the negative pressure chamber 222c. When the solenoid valve is ON, the volume of the negative pressure chamber 222c is reduced so that the path switching valve 222a moves in a direction shown by the arrow A in FIG. 33, and a path from a pump 219 is communicated with another path to an exhaust pipe (an exhaust manifold 8). Thus, secondary air discharged from the pump 219 is supplied into the exhaust pipe.

When the solenoid valve is OFF, force of the spring 222i moves the path switching valve 222a to a position as shown in FIG. 33 so that the path from the pump 219 is communicated with another path to an air cleaner 3. Subsequently, the air discharged from the pump 219 is relieved to the air cleaner 3. As set forth above, in the above secondary air supplying apparatus, a function of the flow control unit can be integrated with that of the relief mechanism, resulting in a downsized apparatus and cost reduction.

Embodiment 20

Figure 34:
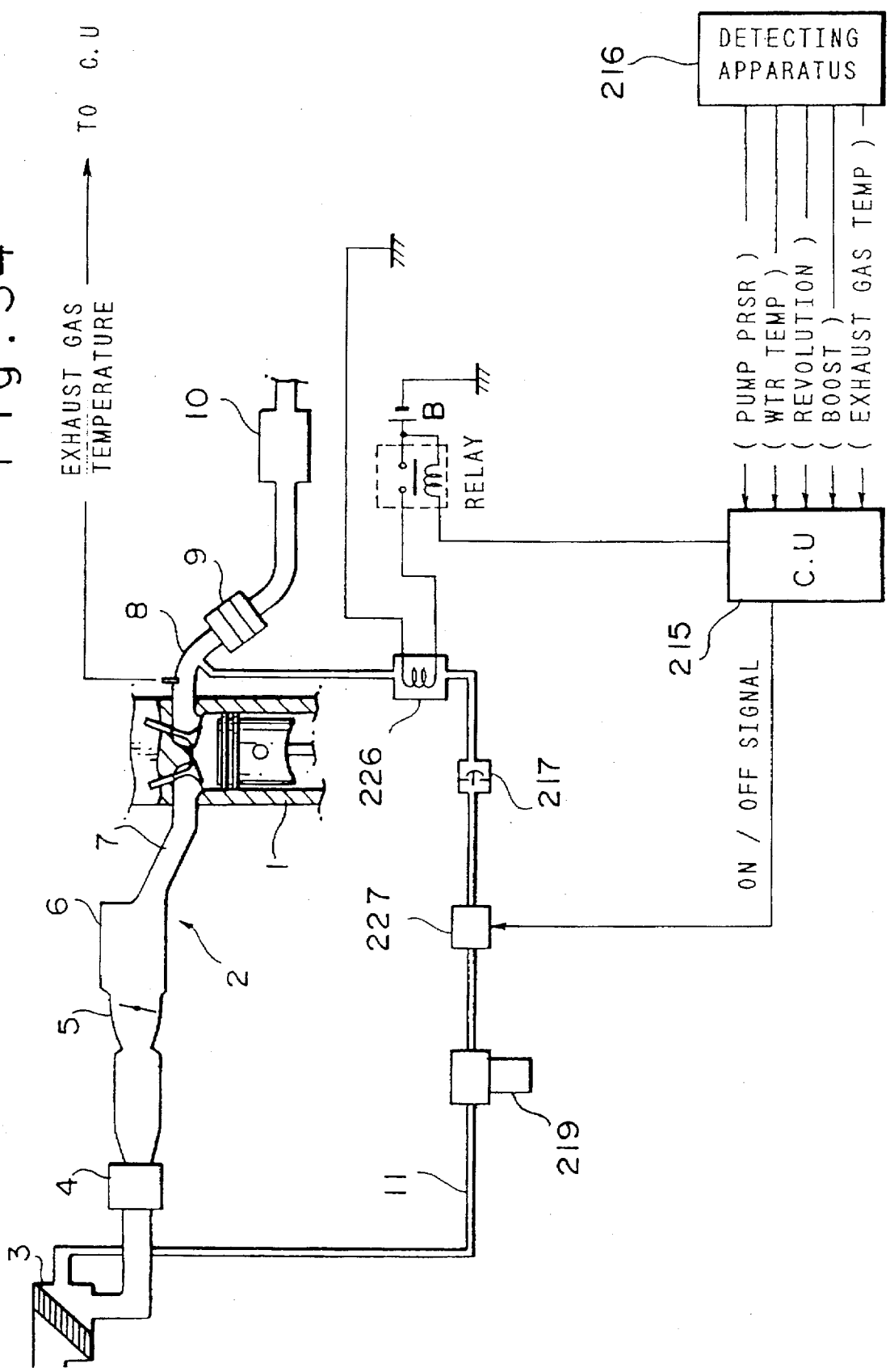
FIG. 34 is a diagram showing an embodiment of a secondary air supplying apparatus according to the twenty-first aspect, and an intake/exhaust system of an internal combustion engine to which the secondary air supplying apparatus is applied.

Referring now to FIG. 34, a description will be given of one embodiment according to the twenty-first aspect. In an apparatus in the embodiment 20, an electric gas heating apparatus 226 is mounted at an end portion of a secondary air supply path 11. In FIG. 34, reference numeral 227 means a cut valve, and a computer unit 215 controls the ON-OFF operation of the cut valve 227 and the gas heating apparatus 226.

In the apparatus according to the embodiment 20, secondary air is heated at the end of the secondary air supply path 11, and is supplied into an exhaust pipe in a temperature rising state. As a result, it is possible to increase an exhaust gas temperature and significantly improve a purification effect in a catalytic apparatus.

Embodiment 21

Figure 35:
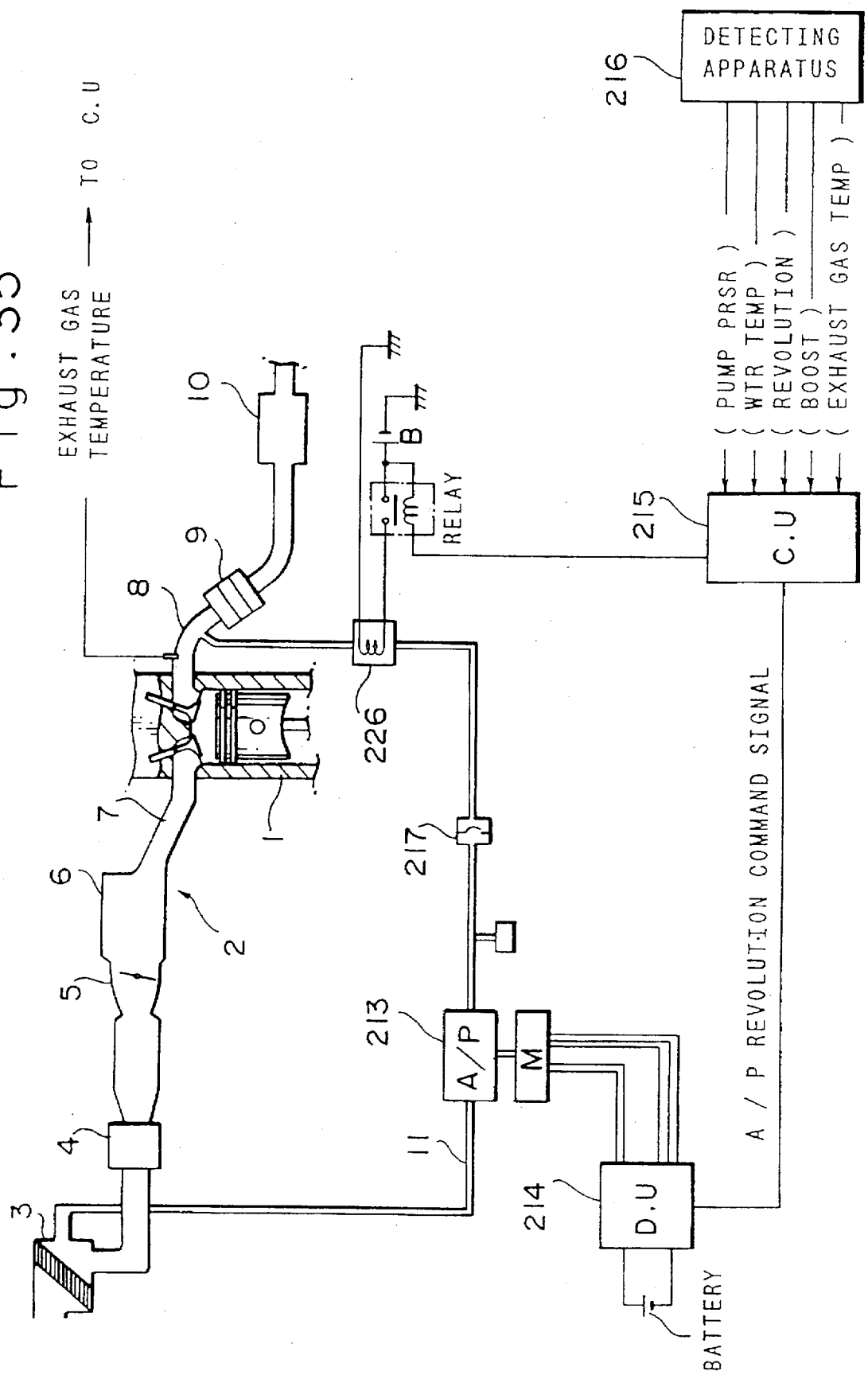
FIG. 35 is a diagram showing an embodiment of a secondary air supplying apparatus according to the twenty-second and twenty-third aspects, and an intake/exhaust system of an internal combustion engine to which the secondary air supplying apparatus is applied.
Figure 36:
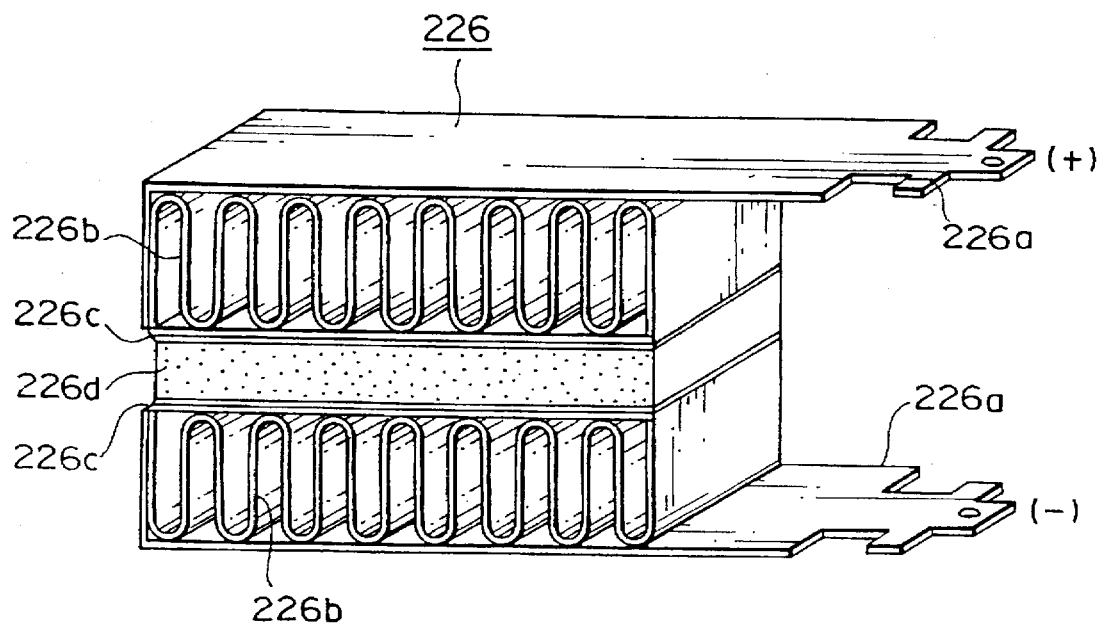
FIG. 36 is a perspective view of one embodiment of a gas heating apparatus according to the twenty-second and twenty-third aspects.
Figure 37:
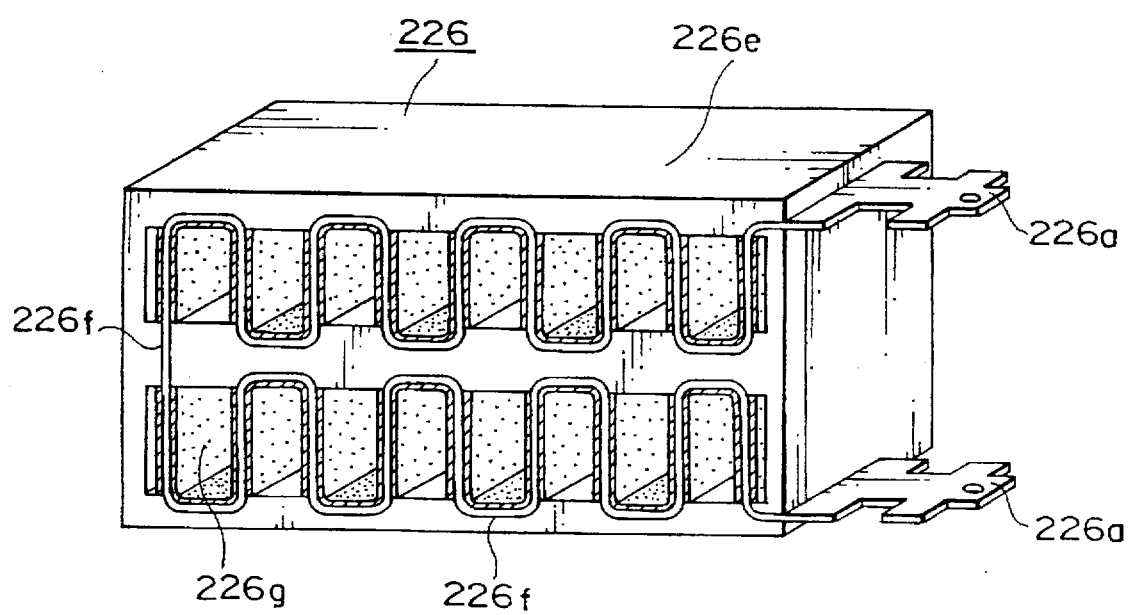
FIG. 37 is a perspective view of another embodiment of the gas heating apparatus according to the twenty-second and twenty-third aspects.

Referring now to FIGS. 35 to 37, a description will be given of one embodiment according to the twenty-second and the twenty-third aspects. FIG. 35 shows a secondary air supplying apparatus in the embodiment 21. The apparatus is provided with a pump 213 employing a motor with a drive unit 214 as described in the embodiment 13, and a gas heating apparatus 226 as described in the embodiment 20.

In the embodiment, an electric gas heating apparatus 226 as shown in FIG. 36 or 37 is employed. The gas heating apparatus shown in FIG. 36 is commercially manufactured as a ceramic heater, and in FIG. 36, reference numeral 226a is a source terminal, 226b is a heating fin, 226c is an electrode, 226d is a ceramic semiconductor resistor. Further, FIG. 35 shows a line heater, and in FIG. 37, reference numeral 226e is a heat resisting insulator, 226f is an exothermic body, and 226g is a coating material such as ceramic material.

In the above apparatus, it is possible to periodically vary a feed rate of the secondary air so as to forcedly supply the secondary air, and to supply the heated secondary air so as to significantly improve a purification performance in a catalytic apparatus 9.

As stated above, according to the first aspect or the second aspect of the present invention, the secondary air is heated by the exothermic body of the gas heating apparatus provided for the secondary air introducing path, and the heated secondary air is mixed with an exhaust gas to flow toward the catalyst. It is possible to effectively remove HC, CO or the like which is rich in an exhaust gas, in particular, at a low-temperature starting time of the engine, resulting in contribution to prevention of the air pollution.

According to the third aspect of the present invention, the temperature of the exothermic body is detected by the temperature sensor, and the power supply is controlled through the control unit according to the detected temperature. As a result, it is possible to continuously provide secondary air having an appropriate temperature, and further improve the purification performance of the catalytic apparatus.

According to the fourth aspect of the present invention, the exothermic body is formed by spirally winding the electric resistor, and is disposed in the case so as to form the air path extending in the same direction as the axial direction of the case, thereby efficiently heating the secondary air by a larger exothermic area. Thus, there is an effect in that, for example, electric power required for heating can be saved.

According to the fifth aspect of the present invention, since the exothermic body is provided in the sheet-like form, it is possible to provide a larger area where the secondary air passing through the gas heating apparatus can contact the exothermic body, and further improve heating efficiency.

According to the sixth aspect of the present invention, the plurality of exothermic bodies are disposed, thereby ensuring a predetermined electric resistance, that is, a heat value without making each electric resistor extremely thin. As a result, there are effects in that the degree of freedom for design increases, and fabrication of the exothermic body is facilitated.

According to the seventh aspect of the present invention, the opposite exothermic bodies are mutually offset such that their air paths are disposed out of alignment with each other. Consequently, air passes through a center portion of the air path of one exothermic body to flow around an electric resistor of the next exothermic body. As a result, it is possible to uniformly heat the air passing through the gas heating apparatus, and further improve heating efficiency.

According to the eighth aspect of the present invention, the plurality of exothermic bodies are supported by the rod for coupling mutual center portions thereof, and the rod is supported by the holder at the both ends of the case. Therefore, it is possible to facilitate assembly of the exothermic body, and stabilize the assembled state.

According to the ninth aspect of the present invention, the air tends to be concentrated on the intermediate portion in the gas heating apparatus, and the cone member distributes the air to the peripheral portion. It is thereby possible to provide uniform inflow of the air in the entire gas heating apparatus, and feed a large amount of air to an exothermic body peripheral portion having a specially large exothermic area, resulting in further improved heating efficiency.

According to the tenth aspect of the present invention, the gas heating apparatus is provided for the secondary air introducing path, and the petal-like exothermic body of the gas heating apparatus can particularly efficiently heat the secondary air passing through the secondary air introducing path. Subsequently, the heated secondary air is mixed with the exhaust gas to flow to the catalytic apparatus. It is thereby possible to promote the catalytic reaction, and effectively remove, for example, HC, or CO which is rich in the exhaust gas, in particular, at the low-temperature starting time of the engine, resulting in contribution to prevention of the air pollution. Further, since the exothermic body is provided in the petal-like form, there is an inherent effect in that an exothermic area can easily be ensured to sufficiently heat the flowing air.

According to the eleventh aspect of the present invention, the both ends of the sheet-like exothermic body are supported by the heat resisting insulator having the through-hole. It is thereby possible to improve a resistance to vibration, prevent the exothermic body from contacting the case due to vibration, impact or the like so as to avoid, for example, short-circuit at a conducting time or damage to the exothermic body due to vibration, resulting in improved resistance to vibration.

According to the twelfth aspect of the present invention, the exothermic bodies are divided into a plurality of layers to provide different resistance for each layer. It is thereby possible to provide a thicker form for the exothermic body, improve efficiency of heat transfer to the air, and further enhance heating efficiency so as to reduce a time required for rising the secondary air temperature.

According to the thirteenth aspect of the present invention, the countless through-holes are provided in the exothermic body so that the gas more frequently enters and exits on the back and front sides of the exothermic body. As a result, it is possible to further improve efficiency of heat transfer.

According to the fourteenth aspect of the present invention, the elastic body is mounted at an end of the heat resisting insulator for supporting the exothermic body, thereby absorbing extension due to thermal expansion of the exothermic body. Further, since pressure is continuously applied in an exothermic body lamination direction, it is possible to highly reliably avoid noise generation, damage or the like due to vibration of the exothermic body.

According to the fifteenth aspect of the present invention, the heat resisting insulator having the elasticity is interposed between the exothermic body and the heat resisting insulator, and the case containing the exothermic body and the heat resisting insulator. Therefore, it is possible to minimize heat transfer to the case, and reduce loss of heat in the exothermic body, so as to improve heating efficiency, and to avoid, for example, damage to the exothermic body due to vibration, impact or the like.

According to the sixteenth aspect to the eighteenth aspect of the present invention, an oxygen rich state and an oxygen short state in the exhaust pipe can periodically be repeated by varying a feed rate of air supplied into the exhaust pipe on the upstream of the catalytic apparatus with predetermined amplitude and for a constant period. It is thereby possible to improve reaction efficiency of the catalyst so as to improve the purification function.

According to the nineteenth aspect of the present invention, it is possible to prevent pressure on the pump discharging side from excessively rising in case the flow control unit is in a closing state, and prevent temperature rising of the pump so as to improve durability and security of the apparatus.

According to the twentieth aspect of the present invention, the flow control unit is integrally formed with the relief mechanism. As a result, there is an effect in that the apparatus can be provided in a smaller and inexpensive structure.

According to the twenty-first aspect of the present invention, it is possible to forcedly supply the secondary air, and heat and feed a sufficient amount of secondary air to the catalytic apparatus. It is thereby possible to optimize a temperature condition and an amount of oxygen in the catalytic apparatus, and significantly enhance the purification function even at a starting time of the engine, resulting in great contribution to prevention of air pollution.

According to the twenty-second aspect of the present invention, while a feed rate of the air supplied into the exhaust pipe is varied with predetermined amplitude and for a constant period, the gas heating apparatus increases a temperature of the secondary air to an appropriate temperature so as to supply the secondary air. Therefore, it is possible to more significantly improve the purification function in the catalytic apparatus.

According to the twenty-third aspect of the present invention, the computer unit automatically controls the operation of the secondary air supplying apparatus according to the sixteenth aspect to the twenty-second aspect depending upon the operating state of the internal combustion engine. As a result, it is possible to perform the optimal operation of the apparatus without any operation by a driver in a vehicle, and sufficiently exhibit an effect of each apparatus.

While preferred embodiments of the invention have been described using specific terms, such description is for illustrative purposes only, and it is to be understood that changes and variations may be made without departing from the spirit or scope of the following claims.

What is claimed is:

1. A secondary air supplying apparatus for an internal combustion engine comprising:

an exhaust passage exhausting exhaust gas from said internal combustion engine;

a catalytic convertor, disposed in said exhaust passage, purifying said exhaust gas;

a secondary air supply passage, a first end of which is connected to said exhaust passage, supplying secondary air upstream of said catalytic convertor;

a heater heating said secondary air flowing in said secondary air supply passage; and a controller controlling said heater based on a temperature of said heater.

2. A secondary air supplying apparatus of claim 1, wherein said heater includes an electric resistor energized by an electric power source.

3. A secondary air supplying apparatus for an internal combustion engine, comprising:

an exhaust passage exhausting exhaust gas from said internal combustion engine;

a catalytic convertor, disposed in said exhaust passage, purifying said exhaust gas;

a secondary air supply passage, a first end of which is connected to said exhaust passage, supplying secondary air upstream of said catalytic convertor;

a heater heating said secondary air flowing in said secondary air supply passage;

a heat sensor sensing temperature of said heater; and a controller controlling said heater based on said temperature of said heater detected by said heat sensor.

4. A secondary air supplying apparatus of claim 3, wherein said controller reduces said temperature of said heater when said temperature is equal to or higher than a predetermined value.

5. A secondary air supplying apparatus of claim 3, wherein said controller increases said temperature of said heater when said temperature is equal to or lower than a predetermined value.

6. A secondary air supplying apparatus of claim 1, wherein said controller cuts off power to said heater when a predetermined period of time has elapsed after start of said internal combustion engine.

7. A secondary air supplying apparatus of claim 1, further comprising:

a flow control valve disposed in said secondary air supply passage, and wherein said controller controls said flow control valve to control a rate of said secondary air flowing in said secondary air supply passage.

8. A secondary air supplying apparatus of claim 1, further comprising:

an air pump disposed in said secondary air supply passage, and wherein said controller controls said air pump to pump said secondary air to said exhaust passage through said secondary air supply passage.

9. A secondary air supplying apparatus of claim 1, further comprising:

an one-way valve disposed in said secondary air supply passage to allow said secondary air to flow only in a direction toward said exhaust passage.

10. A secondary air supplying apparatus of claim 1, wherein said heater has, a hollow cylindrical case, a positive electrode attached to said case, a negative electrode attached to said case, and at least one exothermic element coupled to said positive and said negative electrodes.

11. A secondary air supply apparatus of claim 1, wherein said controller determines said operation condition of said internal combustion engine based on at least one of a detected intake air temperature, water temperature, engine speed, and pressure inside said intake passage down-stream of a throttle valve.

12. A secondary air supplying apparatus of claim 1, further comprising:

an airflow variation apparatus enabling periodic variation in an amount of flow of said secondary air supplied to said exhaust passage.

13. A secondary air supplying apparatus of claim 12, wherein said supplying apparatus includes a pump disposed in said secondary air supply passage, which causes periodic variations in air flow with a constant amplitude.

14. A secondary air heating apparatus comprising:

a hollow cylindrical case;

a positive electrode attached to said case;

a negative electrode attached to said case; and at least one exothermic element in a sheet-like form coupled to said positive and said negative electrodes; and a rod supporting said at least one exothermic element inside said case, said rod being independent from said positive and negative electrodes.

15. A secondary air heating apparatus of claim 14, wherein said exothermic element is formed by spirally winding an electric resistor, and is disposed in said case so as to form an air path extending in a same direction as an axial direction of said case.

16. A secondary air heating apparatus of claim 14, wherein said heater includes a plurality of exothermic elements.

17. A secondary air supply apparatus of claim 16, wherein said plurality of exothermic elements are electrically connected in series, and are axially disposed at intervals in said case.

18. A secondary air heating apparatus, comprising:

a hollow cylindrical case;

a positive electrode attached to said case;

a negative electrode attached to said case; and a plurality of exothermic elements electrically connected in series to said positive and negative electrodes and being axially disposed at intervals in said case, each of said plurality of exothermic elements being in a sheet-like form;

a rod connecting center portions of each of said plurality of exothermic elements; and holders secured to said casing supporting each end of said rod, each of said holders having holes to pass secondary air therethrough.

19. A secondary air heating apparatus, comprising:

a hollow cylindrical case;

a positive electrode attached to said case;

a negative electrode attached to said case; and a plurality of exothermic elements in a sheet-like form electrically coupled to said positive and said negative electrodes, said plurality of exothermic elements being disposed in said hollow cylindrical case such that air paths in each of said plurality of exothermic elements are out of alignment with each other.

20. A secondary air heating apparatus, comprising:

a hollow cylindrical case;

a positive electrode attached to said case;

a negative electrode attached to said case;

at least one exothermic element in a sheet-like form coupled to said positive and said negative electrodes; and a convex cone member disposed at a center portion of an air inflow side aperture in said case.

21. A secondary air supplying apparatus of claim 14, wherein said exothermic element is in a corrugated and annularly curved form such that said exothermic element in a sheet-like form has a petal-like section, and is axially disposed in said case so as to form an air path in said case.

22. A secondary air heating apparatus of claim 21, further comprising:

a heat resisting insulator having a plurality of through-holes supporting both ends of said exothermic element.

23. A secondary air heating apparatus of claim 21, wherein said exothermic element is formed of a plurality of exothermic bodies disposed along an axial direction of said case in series connection.

24. A secondary air heating apparatus of claim 23, wherein each of said exothermic bodies has different electrical resistance.

25. A secondary air heating apparatus of claim 21, wherein said exothermic element is provided with a plurality of holes.

26. A secondary air heating apparatus of claim 21, further comprising:

an elastic body interposed between a heat resisting insulator positioned at a furthest up-stream side among said heat resisting insulators and said case.

27. A secondary air heating apparatus of claim 21, further comprising:

a heat resisting insulator having elasticity interposed between outer peripheries of said exothermic body and an inner periphery of said case.

28. A method for supplying secondary air through a secondary air supply passage to an exhaust passage up-stream of a catalytic convertor, the secondary air supply passage having a heater to heat the secondary air, comprising:

(a) detecting start of an internal combustion engine;

(b) initiating a timer;

(c) detecting a temperature of said heater;

(d) increasing said temperature of said heater when said temperature is equal to or lower than a first predetermined value;

(e) decreasing said temperature of said heater when said temperature is equal to or higher than a second predetermined value; and (f) turning off said heater when a predetermined period of time has elapsed after said start of said internal combustion engine.

* * * * *